(12) United States Patent
Romanenko et al.

(10) Patent No.: US 10,861,159 B2
(45) Date of Patent: Dec. 8, 2020

(54) METHOD, SYSTEM AND COMPUTER PROGRAM PRODUCT FOR AUTOMATICALLY ALTERING A VIDEO STREAM

(71) Applicant: Apical Ltd, Cambridge (GB)

(72) Inventors: Ilya Romanenko, Cambridge (GB); Vladislav Terekhov, Cambridge (GB)

(73) Assignee: Apical Limited, Cambridge (GB)

( * ) Notice: Subject to any disclaimer, the term of this patent is extended or adjusted under 35 U.S.C. 154(b) by 244 days.

(21) Appl. No.: 15/660,252

(22) Filed: Jul. 26, 2017

(65) Prior Publication Data

US 2017/0337692 A1 Nov. 23, 2017

Related U.S. Application Data

(63) Continuation of application No. PCT/GB2016/050176, filed on Jan. 27, 2016.

(30) Foreign Application Priority Data

Jan. 27, 2015 (GB) .................................. 1501311.3

(51) Int. Cl.
*G06K 9/20* (2006.01)
*G06T 7/11* (2017.01)
(Continued)

(52) U.S. Cl.
CPC ............ *G06T 7/11* (2017.01); *G06K 9/00201* (2013.01); *G06K 9/00711* (2013.01);
(Continued)

(58) Field of Classification Search
CPC ... G06T 7/11; G06T 7/73; G06T 7/593; G06T 11/00; G06T 2200/04; G06T 2200/24;
(Continued)

(56) References Cited

U.S. PATENT DOCUMENTS 5,473,740 A 12/1995 Kasson
7,133,571 B2 * 11/2006 Cheatle .................... G06K 9/38
382/282

(Continued)

FOREIGN PATENT DOCUMENTS

EP 2207341 A1 7/2010
EP 2207341 B1 11/2013
WO 2013062509 A1 5/2013

OTHER PUBLICATIONS

Chen Fang et al: "Automatic Image Cropping using Visual Composition, Boundary Simplicity and Content Preservation Models", Multimedia, ACM, 2 Penn Plaza, Suite 701, New York, NY 10120701 USA, Nov. 3, 2014 (Nov. 3, 2014), pp. 1105-1108, XP058058742, p. 1106, right-hand column, paragraph 3—p. 1107, left-hand column, last paragraph.

(Continued)

*Primary Examiner* — Carol Wang
(74) *Attorney, Agent, or Firm* — EIP US LLP

(57) ABSTRACT

There is provided a method for automatically altering a digital video stream including multiple video input frames, to automatically obtain output frames with a target composition, in which frame metadata relating to objects in one or more of the video input frames is analyzed on a frame-by-frame basis and used by a processor to automatically alter one or more output frames to be more similar to, or to match, the target composition, wherein cropping is performed in 3D. A related system and a related computer program product are also provided.

11 Claims, 16 Drawing Sheets

(51) Int. Cl.
*G06T 11/00* (2006.01)
*G06T 7/73* (2017.01)
*G06T 7/593* (2017.01)
*G06K 9/00* (2006.01)

(52) U.S. Cl.
CPC ............ *G06K 9/2081* (2013.01); *G06T 7/593* (2017.01); *G06T 7/73* (2017.01); *G06T 11/00* (2013.01); *G06K 2209/21* (2013.01); *G06T 2200/04* (2013.01); *G06T 2200/24* (2013.01); *G06T 2207/10021* (2013.01); *G06T 2207/10028* (2013.01); *G06T 2207/20132* (2013.01)

(58) Field of Classification Search
CPC . G06T 2207/10021; G06T 2207/10028; G06T 2207/20132; G06K 9/00201; G06K 9/00711; G06K 9/2081; G06K 2209/21
See application file for complete search history.

(56) References Cited

U.S. PATENT DOCUMENTS

| | | | | |
|---|---|---|---|---|
| 9,165,388 | B2 * | 10/2015 | Delia | G06T 11/60 |
| 9,279,983 | B1 * | 3/2016 | Davis | G02B 27/01 |
| 9,641,754 | B2 * | 5/2017 | Oh | H04N 5/232 |
| 2006/0193509 | A1 * | 8/2006 | Criminisi | G06K 9/00241 382/154 |
| 2009/0290758 | A1 * | 11/2009 | Ng-Thow-Hing | G06T 7/73 382/106 |
| 2011/0267499 | A1 | 11/2011 | Wan et al. | |
| 2012/0075432 | A1 * | 3/2012 | Bilbrey | G06T 7/593 348/48 |
| 2012/0198337 | A1 | 8/2012 | Flint et al. | |
| 2013/0195374 | A1 | 8/2013 | Fukata et al. | |
| 2013/0286240 | A1 | 10/2013 | Kim et al. | |
| 2015/0161466 | A1 * | 6/2015 | Welinder | G06F 16/5838 382/195 |
| 2016/0269645 | A1 * | 9/2016 | Khoe | H04N 5/23293 |

OTHER PUBLICATIONS

Standards et al: "The IEEE Standard Dictionary of Electrical and Electronics Terms Sixth Edition", IEEE Std, Jan. 1, 1996 (Jan. 1, 1996), pp. 648 "metadata"; 651 "metric". XP55328876.
International Search Report and Written Opinion dated May 11, 2016 for PCT Application No. PCT/GB2016/050176.
Second International Search Report and Written Opinion dated Jan. 2, 2017 for PCT Application No. PCT/GB2016/050176.

* cited by examiner $$EAQ = \sum_{n=0}^{N} f_n(rule_n) \quad (1)$$

$$Object_{3D} = Object_{2D} * M_{realworld} \quad (2)$$

$$STM = \frac{\sum_{n=0}^{N}(response_n * w_n)_n}{N} \quad (3)$$

$$ASV = \frac{(a-b)}{c} \quad (4)$$

$$DIT = abs(a-b) \quad (5)$$

$$DL = a * w \quad (6)$$

$$SV = v * w + \sum_{n=0}^{N}(v_n * w_n) \quad (7)$$

FIGURE 16

METHOD, SYSTEM AND COMPUTER PROGRAM PRODUCT FOR AUTOMATICALLY ALTERING A VIDEO STREAM

CROSS-REFERENCE TO RELATED APPLICATIONS

The present application is a continuation of International Application No. PCT/GB2016/050176 filed Jan. 27, 2016, which claims priority to Great Britain Application No. GB 1501311.3 filed Jan. 27, 2015, both of which are incorporated herein in their entirety.

BACKGROUND

Field of the Disclosure

The field of the disclosure relates to methods, systems and computer program products for video and image processing.

Technical Background

Cropping of images or video may lead to artefacts. For example, it can be very difficult to crop an image of a person who is presented in front of a complex or related background. For example, a person standing in front of vegetation, who is dressed in clothing with a similar colour to the vegetation, can be very hard to process successfully in cropping. Possible artefacts after cropping are that the person includes some of the vegetation, or that the person is missing part of their body which has been cropped away because it appeared too similar to the vegetation.

Although it is known to alter a digital video stream to obtain output frames with a reduced area, the result may be one which fails to provide a viewing experience which is close to one that would be generated by a skilful camera operator, such providing space in the video frame image in front, and in the direction, of moving or stationary subjects.

DISCUSSION OF RELATED ART

CHEN FANG ET AL: "Automatic Image Cropping using Visual Composition, Boundary Simplicity and Content Preservation Models", MULTIMEDIA, ACM, 2 PENN PLAZA, SUITE 701, NEW YORK, N.Y., USA, 3 Nov. 2014 (2014-11-03), pages 1105-1108, XP058058742 discloses a method of cropping an image based on a model that measures a quality of composition for a given crop. The model is trained based on a large set of well-composed images via discriminative classifier training.

US20130195374A1 discloses an image processing apparatus including a composition setting unit that, when a first trimming region in which an object included in an input image is arranged with a first composition is beyond a range of the input image, sets a second trimming region in which the object is arranged with a second composition.

US20120198337A1 discloses scaling and cropping of video clips. A video clip sequence can be generated from one or more video clips. Video clips added to the video clip sequence can be automatically modified (e.g. scaled and/or cropped) to conform to the dimensions and/or aspect ratio of video clips in the video clip sequence.

US20130286240A1 discloses operating method of an image capturing device includes capturing an image; detecting a target object from the captured image; calculating modification parameters based on the detected target object; generating an adjusted image by adjusting a size of an area of the captured image according to the modification parameters; and displaying the adjusted image.

US2011267499 (A1) discloses a method of performing a zoom operation on a camera, wherein, one or more regions of interest within a captured image of a scene are determined. Camera motion direction towards one of the regions of interest is determined. A target region of interest is determined based on the determined camera motion direction. The zoom operation is performed to the target region of interest.

EP2207341(A1) and EP2207341(B1) disclose an image processing apparatus and method, an image capturing apparatus, and a program which make it possible to crop an image with an optimal composition even for a subject other than a person. A composition pattern setting section sets a composition pattern corresponding to an input image, on the basis of the number of salient regions to which attention is directed in the input image, and the scene of the input image. On the basis of the composition pattern set by the composition pattern setting section, a composition analyzing section determines a crop region in the input image which is optimal for an image to be cropped in the composition pattern from the input image.

SUMMARY

According to a first aspect of the disclosure, there is provided a method for automatically altering a digital video stream including multiple video input frames, to automatically obtain output frames with a target composition, in which frame metadata relating to objects in one or more of the video input frames is analyzed on a frame-by-frame basis and used by a processor to automatically alter one or more output frames to be more similar to, or to match, the target composition, wherein cropping is performed in 3D.

An advantage is that 3D cropping produces fewer artefacts than cropping in 2D. For example, in a 2D crop, a small person may remain as well as a more distant larger person because the two appear to be about the same size in a 2D image. However, in 3D cropping, the more distant person can be excluded on the basis of being further away than the closer person, so 3D cropping can keep the closer person and eliminate the person further away, for example.

The method may be one in which the cropping performed in 3D is performed using a 3D coordinate system. An advantage is that this provides a convenient framework for computation. The method may be one in which the cropping performed in 3D is performed based on depth. An advantage is that depth is a parameter which can be processed efficiently. The method may be one in which the cropping performed in 3D based on depth is performed using depth sensor data. An advantage is that sensor data can be used directly, without a depth calculation step. The method may be one in which the cropping performed in 3D is performed for a single target object. An advantage is that a video for a single object can be produced, in spite of a complex or similarly colored background. The method may be one in which the cropping performed in 3D is performed for a plurality of target objects. An advantage is that a video for a plurality of target objects can be produced, in spite of a complex or similarly colored background.

The method may be one in which images from at least two cameras are used to assess depth. An advantage is that two cameras will provide different views, so depth may be assessed readily. The method may be one in which the at least two cameras are those of different users in a social network. An advantage is that social networks may be used to provide input video streams that would be unavailable otherwise. The method may be one in which stereo imaging is used to assess depth. An advantage is that stereo imaging may be readily processed to assess depth. The method may be one in which cropping 3D scenes uses a slightly different crop applied to left and right stereo scenes to keep a viewing disparity post cropping, so that a zooming step has an effect of getting closer, rather than just getting bigger. The method may be one in which the stereo imaging is used to decide to crop small things. An advantage is that small things which clutter a scene may be readily removed.

The method may be one in which depth information is used in a graphic display controller (GDC) to keep perspective. An advantage is computational efficiency. The method may be one in which a camera iris is controlled to affect a depth of field (DoF). An advantage is that a desired minimum depth of field can be provided, which is suitable for implementation of the cropping performed in 3D. The method may be one in which the camera iris controlled depth of field (DoF) is controlled so as to provide a depth of field (DoF) that is suitable for implementation of the cropping performed in 3D. The method may be one in which an image and/or data used by data analytics is obtained by one or more image sensors for an area of view produced by a field of view. The method may be one in which an input area is used by data analytics for objects detection. The method may be one in which an extract area is a set of mathematical parameters to be extracted from a combined set of the input area and detected objects or from a combined set of multiple input areas and multiple detected objects. The method may be one in which a plurality of categories are used for categorizing objects. An advantage is a method that is robust against noise or spurious data is provided.

The method may be one in which object filtering is used. The method may be one in which object recognition is used. The method may be one in which group reconstruction is used. The method may be one in which the group reconstruction is by using speed. The method may be one in which the group reconstruction by using speed uses predefined speed patterns as a basis for prediction. The method may be one in which scene type metrics are calculated. The method may be one in which scene type metrics are evaluated using speed analysis. The method may be one in which scene type metrics are evaluated using type patterns. The method may be one in which scene type metrics are evaluated using coordinates analysis. The method may be one in which objects processing is used to perform filtration of redundant information and or reconstruction of partially and or completely lost regions of interest by performing analysis of region structure and or behavior over a time scale and or speed and or coordinates in 3D space.

The method may be one in which a bounding surface area is calculated. The method may be one in which the bounding surface area is a regular polyhedron in 3D space. The method may be one in which the bounding surface area is an irregular polyhedron in 3D space. The method may be one in which a speaker is identified, who then becomes a target object in the target composition. The method may be one in which in the speaker is identified using phased microphones. The method may be one in which in the output frames a halo or other identifier is drawn around the speaker. The method may be one in which in the output frames the speaker is made a bit brighter. The method may be one in which in the output frames a speaker's mouth is blurred to prevent lip-reading. The method may be one in which a user interface is provided for input, in which in response to selecting (e.g. clicking) on one person or object, the cropping which is performed in 3D is performed around that person or object.

Use in a security application of a method of any aspect according to a first aspect of the disclosure may be provided. The use may be one in which the security application is an airport security application. Use for a music concert video stream of a method of any aspect according to a first aspect of the disclosure may be provided. Use for a sporting activity video stream of a method of any aspect according to a first aspect of the disclosure may be provided. Use for a video conferencing application video stream of a method of any aspect according to a first aspect of the disclosure may be provided. Use in a Distributed Interactive Simulation (DIS) video stream of a method of any aspect according to a first aspect of the disclosure may be provided.

According to a second aspect of the disclosure, there is provided a system comprising a processor, and storage storing a digital video stream including multiple video input frames and frame metadata relating to objects in one or more of the video input frames, and a computer program product executable by the processor, wherein the computer program product is executable by the processor to automatically alter the digital video stream including the multiple video input frames, to automatically obtain output frames with a target composition, in which the frame metadata relating to objects in one or more of the video input frames is analyzed on a frame-by-frame basis and is used to automatically alter one or more output frames to be more similar to, or to match, the target composition, wherein cropping is performed in 3D.

The system may be one including storage for the output frames, wherein the output frames are stored in the storage for the output frames. The system may be one operable to perform a method of any aspect according to a first aspect of the disclosure.

According to a third aspect of the disclosure, there is provided a computer program product executable by a processor, the computer program product executable to automatically alter a digital video stream including multiple video input frames, to automatically obtain output frames with a target composition, in which frame metadata relating to objects in one or more of the video input frames is analyzed on a frame-by-frame basis and used to automatically alter one or more output frames to be more similar to, or to match, the target composition, wherein cropping is performed in 3D. The computer program product may be executable to perform a method of any aspect according to a first aspect of the disclosure.

It is an object of the present disclosure according to one aspect of this disclosure to provide a method and apparatus for a crop operation on an image and/or set of images and/or video frames. The method may include analysis of regions of interest within captured image(s) of a scene from one or several sensors; the sensors may include sensors in visible spectra and/or sensors in infra red spectra and/or thermal sensors and/or ultra sonic sensors and/or sensors in non visible spectra and/or sensors of acceleration detection; and/or selecting the appropriate regions of interest by performing filtration; and/or reconstruction of partially and/or completely lost regions of interest by performing analysis of region structure and/or behaviour in time scale and/or speed and/or coordinates in 2D and or 3D space; and/or grouping the regions of interest by performing analysis of region metrics; and/or group reconstruction by performing analysis of group structure and/or behaviour in time scale and/or speed and/or coordinates in 2D and/or 3D space; and/or performing scene selection by analysis of the region metrics; and/or selecting the appropriate crop method by using scene type and/or region metrics.

It is an object of the present disclosure according to one aspect to provide a method and apparatus for a zoom operation for a selected crop image; and/or analysis of sensors metrics and selection of appropriate maximum zoom value; and/or analysis of sensors metrics and selection of appropriate speed of zoom-in operation in a time scale and/or appropriate speed of zoom-out operation in a time scale.

It is an object of the present disclosure according to one aspect to provide the method and apparatus for the zoom/image stabilization operation for selected crop image; and/or analysis of regions metrics by selecting appropriate smoothing coefficients.

It is an object of the present disclosure according to one aspect to provide a method and apparatus for creation of additional image and/or graphic objects and insertion to a cropped image.

BRIEF DESCRIPTION OF THE DRAWINGS

The above and other aspects of the disclosure will now be described, by way of example only, with reference to the following Figures, in which:

FIG. 16 shows formulae referred to elsewhere in this document.

DETAILED DESCRIPTION

Figure 1:
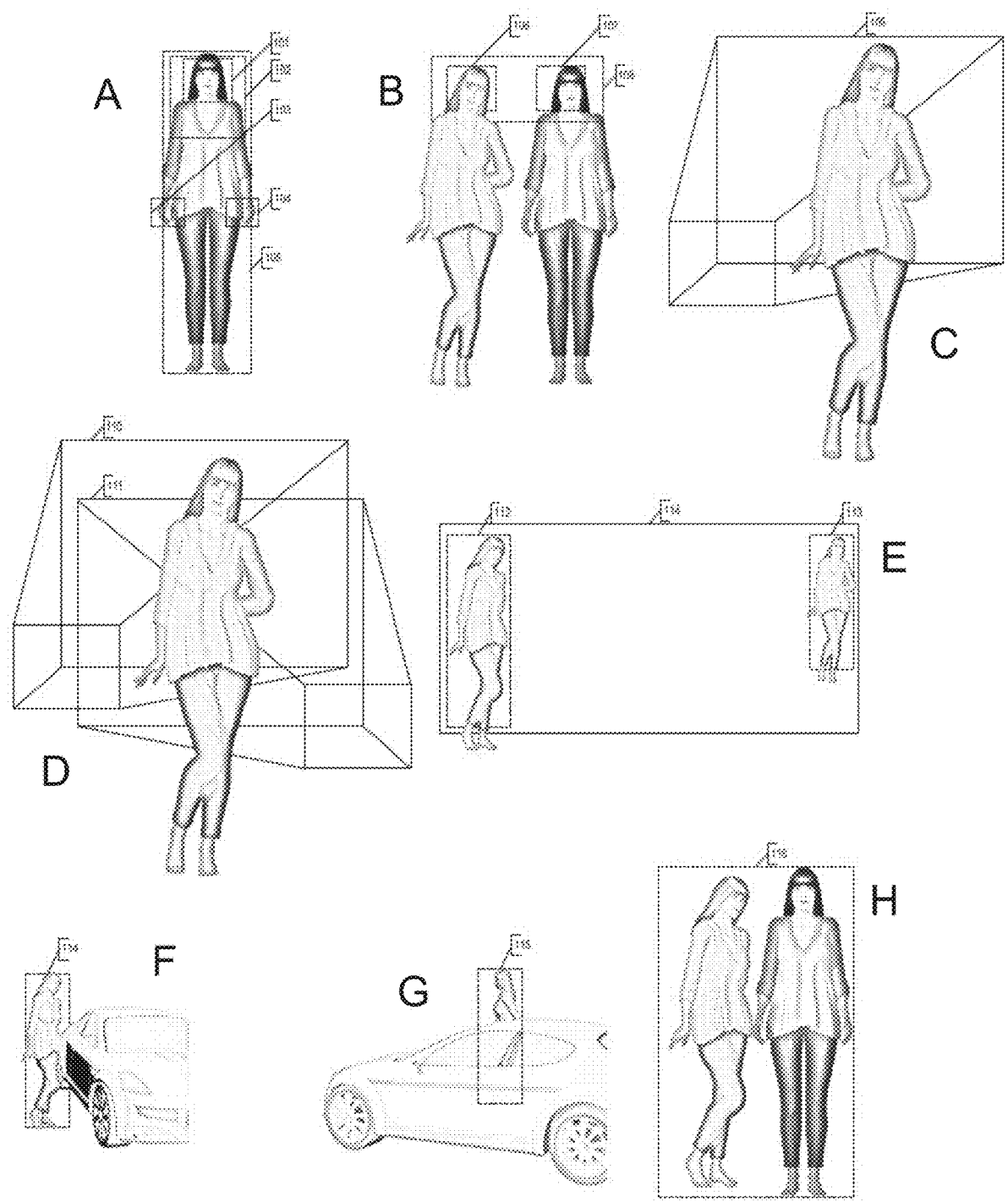
FIG. 1 shows an example of a set of images illustrating objects used by data analytics and data processing, in an example.

There is provided a method for automatically altering a digital video stream including multiple video input frames, to automatically obtain output frames with a target composition, in which frame metadata relating to objects in one or more of the video input frames is analyzed on a frame-by-frame basis and used by a processor to automatically alter one or more output frames to be more similar to, or to match, the target composition, and in which the target composition is defined by a set of rules that are aesthetic rules that give the output frame a desired aesthetic appearance, and that go beyond trivial rules of maximally filling a frame with an object, or placing an object in the center of the frame.

There is provided a method for automatically altering a digital video stream including multiple video input frames, to automatically obtain output frames with a target composition, in which frame metadata relating to objects in one or more of the video input frames is analyzed on a frame-by-frame basis and used by a processor to automatically alter one or more output frames to be more similar to, or to match, the target composition, and in which the target composition is defined by a first set of rules that are functional rules, such as maximally filling a frame with an object, or placing an object in the center of the frame, and a second set of rules that are aesthetic rules that give the output frame a desired aesthetic appearance.

Features may include, alone or in combination: Altering involves cropping; Altering involves zooming; Altering involves giving the appearance of tracking; Altering involves giving the appearance of panning; Processor tracks, matches, verifies or identifies objects in each frame; Metadata defines object proportions in each frame; Metadata defines object motions in each frame; Metadata define object pose in each frame; Metadata defines the position of one or more objects in a scene in each frame; Metadata defines the head, upper body and full body of a person in each frame; Metadata includes the relative orientation of that person or part of that person to the camera in each frame, such as direction the face and/or upper body is pointing towards; Metadata defines the proportions of an object using the proportions of a rectangle fitted around the object in each frame; Metadata includes the rate and/or direction of movement of the object in each frame; Metadata is used by a processor to automatically alter one or more frames to be more similar to, or to match, the target composition at predefined rate of convergence to that target composition; Rate of convergence is defined by a speed which determines the number of steps or frames required to reach the target composition, such as cropping over 32 frames from an input frame to the target frame.

The fundamental elements of the composition may be the set of people found in the scene, their relative proportions and locations in the frame, their individual poses, and their individual trajectories. A number of rules may be generated in order to set a target composition based on relative weighting between these elements: for example, priority is given to making the largest person as large as possible and centered in the frame; or priority is given to keeping all people within the frame; or priority is given to a specified individual (see below) and the target composition is based either on pose and/or trajectory: if the person is facing or moving to the right, then the target composition is to place the person towards the left of the frame, in order to retain more relevant background. In the prior art, either a still image frame is cropped based on face detection such that the face occupies a certain position (normally centered) and proportion of the frame. Also, tracking of a subject, via face detection or background subtraction, is known in a "PTZ" (pan-tilt-zoom) security camera, such that the camera zooms and centers a moving object within the frame. A problem with background subtraction is that the subject is lost when it stops moving. In the present system, the camera may additionally be in motion due to the action of the user (smartphone) and also information on the pose of the person is available to set the target composition. A step may be the determination of a target composition based on a rule which incorporates at least the pose of one or more moving objects and either the trajectory of such object and/or independent motion of the camera (via the user). The target composition is obtained for every frame and as such represents a set of points in a multidimensional space with one dimension time and the other dimensions referring to position, size, pose etc. In order to achieve a smooth result, this noisy data must be filtered in time and optionally in space, such that the actual composition at the current frame converges towards the target composition over a number of frames. Various methods of filtering this kind of data are known, for example simple window averaging, recursive filtering and normal or extended Kalman filtering.

Method is performed in real time. Target composition is selectable in real time. Method re-purposes the small (e.g. 2 Mb) window normally used for image stabilization and processes image data from that window in real time, e.g. for tracking.

Method is performed as post-processing. All video and all metadata are recorded first, for post-processing. All video and all metadata are recorded first, for post-processing, for playback in a selected playback mode.

Metadata provides real time object tracking. Metadata is able to define multiple objects or classes of objects. Metadata is obtained at a minimum of 10 frames per second. Target composition defines objects or multiple classes of objects. Target composition defines the number of people to be included in a frame. Target composition is one in which positioning of the object within the window can be automatically controlled; if the object is a person, then pose information is used: if the person is looking straight ahead, then the person is located within a central region of the window; if looking to the camera's right, the person is located in a column in the right-hand side of the window; if looking to the left, then the person is located in a column in the left-hand side of the window (the window may be divided into three columns, using golden ratios).

Target composition defines the desired size of an object with respect to the frame. Target composition defines a target object as a head, upper body or full body. Target composition defines target objects as a head, an upper body and a full body. Target composition is that a face should be centered in the frame. Target composition is that a face should occupy a defined proportion or extent of the frame. Target composition is that a face should include a defined proportion or extent of 'face room' in the direction the face is pointing to. Target composition tries to keep all subjects in a frame, and to zoom slowly. Target composition targets just the largest person, and permits rapid zoom into that person.

Target composition is a 'Portrait' or 'Conference call' mode in which cropping is based on detecting the head and upper body and ignoring the rest of the body. Target composition is an 'Action Moment' mode: most sports have 'classic' moments with a strong visual signature—e.g. for ski-cross, it could be when the skier is fully airborne and crosses both skis; for tennis, it could be the instant both players feet are off the ground, for football, it could be the instant of contact with the ball. These are all very hard to capture manually, but a computational camera could be continuously detecting an object and looking for these signature events—it could increase frame rate to say 240 fps when it looked like such an event (from an analysis of preceding frames) was likely, or could trigger a still frame capture at the perfect moment. Target composition is a 'Friends & Family' mode, in which known friends or family members in a scene are detected and tracked and zoomed-into. This is achieved by periodically capturing the "best shot" of a tracked person, whenever their face is directed, even momentarily, towards the camera, and then comparing the captured face with a database of known faces via a standard face recognition method. User can select a person to be tracked and/or zoomed into by touching an image of that person, displayed on a touch screen display. Target composition is a 'Concert' mode, in which a user-defined person on stage is tracked and/or zoomed into. For wearable cameras like Google Glass, voice control will be a natural interface. Target composition defines a ratio in the frame between tracked objects and the size of a border around the tracked objects. Target composition defines a ratio of frame edge lengths. Ratio is Golden ratio. Ratio is 1:3. Target composition defines a position of a figure in the frame, and the size of the figure relative to the frame. Target composition is one which can be learned from an example video sequence.

In an example video sequence, the sequence is parsed into individual scenes, using a scene detection algorithm; metrics are taken from each scene, using most probable values and the metrics are used as target parameters in the target composition. The metrics include one or more of typical face size, body size, number of people in the frame. The metrics include any other user-defined or selected parameters that dictate the appearance or style of the video frames. In an example video sequence, the sequence is parsed into individual scenes, using a scene detection algorithm. Average zooming speed is derived from the video sequence. Derived average zooming speed is used to define a target rate of convergence to the target composition. Target composition is one which is learned from the present video sequence. Different target compositions can be applied to different sequences of the video frames, either randomly, or following a defined template, which may be content-specific. Target composition is a conference style composition, in which target objects are head objects and head & shoulders objects, but target objects are not body objects. Target composition is a video chat style composition, in which a camera is automatically selected from a plurality of available third-party cameras (e.g. many locally available in an airport) as having the best view of a target object (e.g. head or head & shoulders). Tracked objects in a target composition should not be changed unless it is clear that the tracked objects are no longer present to a highly significant extent.

Target composition is a film director style composition, which is a particular visual style. Style is 'Blair Witch' mode, could use shaky simulated night-vision appearance. Style is 'Scorsese's Raging Bull' mode—high-contrast b/w, with extensive slow-motion. Style is 'Ang Lee's Crouching Tiger' mode—use super-saturated colors with extensive slow-motion. Film director is Spielberg or other user selected director.

Target composition is defined in a downloadable app. Target composition is one person in the foreground and another person further away from the foreground. Target composition involves tracking an object that is moving in one direction in the scene, and editing the video frames so that the object is not maintained at a fixed position in the frames but instead moves gradually across the frames in that same direction, at a defined rate. Target composition is achieved by a perspective distortion operation performed on each frame. This makes person of interest bigger and/or other things in the frame smaller. This may involve the segmentation of the person of interest from the background, then the scaling (enlargement) of the segmented region, and then the superimposition of the scaled segment back onto the original image.

Phased microphones are used to identify a speaker, who then becomes the target object in the target composition. Draw a halo around the speaker. Make the speaker a bit brighter. Blur a speaker's mouth to prevent lip-reading. Conceal a person.

The video stream is selected from a plurality of cameras to provide the camera output video stream which best matches a target composition. The selected video stream can be switched from one camera to another camera. E.g. This would work well in cases where people are moving, and the cameras track them—better still if there is some known geometry to the scene—the football example works really well—where you can actually be following your favorite player e.g. in a close-up window. If a group of friends are all filming the same event, then they could share their footage at e.g. a central server or one of their devices and then the footage can be edited automatically, using the object track records to ensure for example that the best views are used—e.g. we can auto-cut to maintain the best views of say the lead singer in a band, using video from all available cameras—as the lead singer looks towards different cameras, we can use the pose information (either extracted locally or at the server) to auto-cut to the camera the singer is most closely looking towards. We can auto-cut too in different styles—e.g. in 'Scorsese' s Raging Bull' mode, edits could be fast-paced. In 'Merchant Ivory' mode, edits could be languid, with lingering close-ups.

A way of achieving this may be as follows: two smartphone users independently capture video of the same subject(s) at the same location at the same or similar times. Object metadata is captured at the time of video capture, including "best shot" crops of the subject(s) faces whenever they momentarily look at the camera. Additional metadata including timestamps and geolocation information is also included, which is available via the smartphone operating system. The metadata is appended to the video files using the standard MPEG wrappers, and the videos are independently uploaded to a central server. The server compares the two video files to determine that they correspond to the same event, using the timestamp and geolocation information. The server also identifies that the two users are in the same social network and have agreed to share information with one another. Software on the server then compares the "best shot" crops in the two videos using standard face recognition methods to determine which if any of the subjects in each video correspond to the same individual. Software then analyses the pose and trajectory of each individual, based on the attached metadata, to determine which video contains the best view of the individual at a given time. For example, the best view may be the view in which the face of the individual is directed towards or most closely towards the camera. Following this analysis, the software applies rules to edit the videos together. For example, a single video is generated using the two sources, such that at any given time the frames from the video with the best view are used, with an additional rule that the videos should not be cut more frequently than a defined interval, for example 5 seconds. More complex rules can also be envisaged. The edited video is then shared with the two users, so that each sees the same edited video as a result. Further, face recognition may be used to identify the individuals, via comparison with an already-tagged still image database. In this case, the editing software may automatically assign a priority to a particular individual when choosing which source to use of the particular segment of the edited video, and this priority may be different for the two original users, based on their preferences, such that two different edited videos are created from the two original video sources, and one is provided to the first user and the second provided to the second user. Target composition includes a target direction in which a person is looking. Gestures can be detected e.g. hand up.

Target objects for possible detection include a plurality of models of a hand, an upper body, and a whole body, so as to be able to identify gestures or poses. Use gestures or poses to provide a selected director mode as a targeted composition. Metadata includes a tracked path of an object. Cropping is performed in 2D. Cropping is performed in 3D, e.g., using depth sensor data. Camera iris is controlled in real time to alter the depth of field. Target composition includes intentionally blurring at predefined depths.

Method can provide for apparent camera rotation. Method can provide geometric distortion compensation, so relative size of objects can change.

A method is provided in which still images are automatically captured whenever a particular pose of a subject is detected. For example, when the subject looks at the camera (a given glance may correspond to many video frames, so typically only one still image will be captured within a small interval in real time, to avoid capturing many very similar images). The "best shot" may also be determined by trajectory analysis of a tracked object. For example, the apogee of the trajectory of someone jumping in the air. Because in typical smartphone camera modules, the full image resolution of the sensor is processed, with downscaling to the video output resolution performed at the end of the processing pipeline, it is convenient in this way to capture high-resolution stills at the same time as video. This process therefore automates the existing procedure of "manual still image capture during video capture" which is problematic for the user, as it is difficult to press the button during video capture without destabilizing the camera and also to press the button at exactly the right instant.

The images captured in the above method may be appended or otherwise associated with the video file, so that they can be used to provide the visual preview index of the video or can be arranged spatially around the video during playback to provide the user with a more emotionally engaging way of viewing the video and still images together, or the still images can be viewed in a gallery, and the video playback triggered from the frame of the still capture upon clicking or otherwise interacting with the still image.

Other aspects: Computer program product implementing any one of the methods; Mobile phone, smartphone, augmented reality glasses, or any other form factor of video camera, configured to implement any one of the methods; Server configured to implement any one of the methods; Use of any one of the methods for video streaming of sporting activities; Use of any one of the methods for a video conferencing application.

Other Core Concepts

Method for analyzing a video stream recorded using a zoomable camera, in which the video stream includes frames, in which an object detection algorithm is applied to a frame, and in which if no object is detected in the frame, the camera is subjected to a step of zooming out.

Using metadata tracking results for image stabilization.

A conference calling phone system including directional microphones and cameras that can pan or otherwise move to capture an individual who is speaking; in which a computer vision system is programmed to detect the movement of an individual and to control the cameras to maintain tracking of that individual. Further features may be: Computer vision system detects upper body pose; Video frames are automatically edited in real-time to crop and/or zoom into the person detected as speaking; Gestures are detected and have specific control functions, such as exclude me from tracking, join meeting, add me; Computer vision system automatically adds a visual highlight to the person detected as speaking; Computer vision system automatically adds obfuscation to a specific person's face.

Further Notes

A smart crop and zoom process may be divided into the following stages: real time (for capture), indexing, and providing post processing viewing styles.

Direction and velocity data can be used to improve the pan and zoom processes.

In an interactivity example, in a user interface it may be possible to click on one person or object in a group, and perform a smart crop and zoom on that person or object.

In a 3D scene, cropping may be configured to be a crop based on depth. In an example, stereo imaging is used to assess depth. In an example, stereo imaging is used to decide to crop small things. Could also combine this with depth and graphic display controller (GDC) to keep the perspective. In an example, the Iris may be controlled to affect the depth of field (DoF), but note that this affects the detected scene. The depth of field may be added as an effect in post processing. In an example, the Iris may be controlled to affect the depth of field (DoF) so as to provide a depth of field (DoF) that is suitable for the implementation of cropping in 3D. In an example, cropping 3D scenes uses a slightly different crop applied to the left and right scenes to keep the disparity post cropping/zooming. So zooming has the effect of getting closer, rather than bigger.

Smart crop and zoom may also be provided in Distributed Interactive Simulation (DIS). Distributed Interactive Simulation (DIS) is an IEEE standard for conducting real-time platform-level war gaming across multiple host computers and is used worldwide, especially by military organizations but also by other agencies such as those involved in space exploration and medicine.

In a video conference example e.g., with a user making a video call from an airport lounge, the user uses their smartphone "app" to select a view from one of the cameras (e.g. in the airport). The system has already worked out who and where the user is to make the connection simple. The camera may already apply some auto-zooming to center the user in the scene. Then, using the people detection, optionally mask other people out (e.g. blur them). Then, any additional smart cropping/zooming is applied. This could all be happening simultaneously, and dynamically if the user were to get up and move, or people to join/leave the scene.

DESCRIPTION

This disclosure includes disclosure of a method of producing a cropped and/or scaled and/or stabilized image from an original image by using analysis within a region of interest characterized by metrics.

FIG. 1 shows a set of images A to H used to assist a detailed explanation. The data analytics is an extended block. A purpose of the data analytics is an image analysis and detection of particular features. These detected features may include (A) the face 101, the head and shoulders 102, the full FIG. 105, and the hands 103 and 104. The detected features may have metrics such as: size, angle, type, color information, temperature, position. These metrics may have two dimensional space (2D) parameters and/or three dimensional space (3D) parameters. A detected feature will be referred to later in this document as an "object". The faces from two different persons 106 and 107 may be united as group 108 (B). The image and/or data used by data analytics may be obtained by image sensor(s) in the area of view produced by field of view 109 (C). The field of view (also field of vision, abbreviated as "FOV") is the extent of the observable world that is seen at any given moment. It is possible to have two sensors with individual FOVs and these two FOV's will intersect with each other as depicted by 110 and 111 (D). As a result the same person or object 112, 113 will be shown in the two corresponding frames with different angles, sizes, and positions (E). Because the same person or object is shown with different views, the person in one FOV may be shown at full length 114 (F) and in another FOV the same person will be intersected with another object 115 (G). For person 115, it is possible to predict or reconstruct the lost features by using a predefined structure. The structure may include parts and relationships between these parts and these parts may have mathematically predefined links as size proportions, distance between each other, speed, angles, acceleration and many others. The one or two or more persons or objects may have relationships described as object rule and multiple object rule. For example: object is a point of interest if yaw angle between 80+/−10 degrees, or two objects is point of interest if the first object have particular position and size and the second object have particular speed and size. As result the point of interest shall be linked as group 116 (H). Group is a set of objects/parents, as group is a child of these parents. Group may have one or more parent. The parent itself is a real object, or predicted/reconstructed object or another group.

Figure 2:
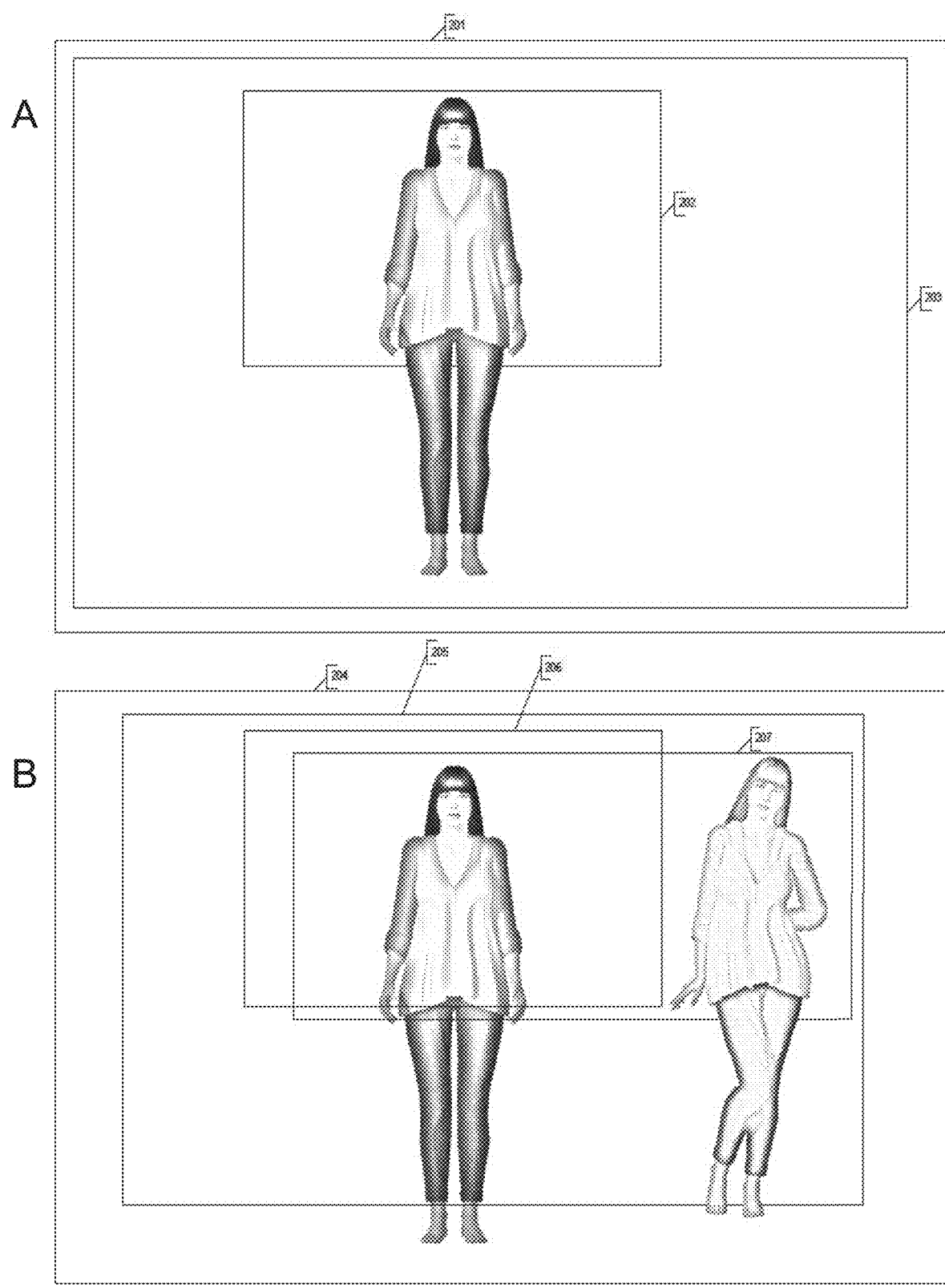
FIG. 2 shows an example of a set of images illustrating concepts of target area, intermediate area and extraction area, in an example.

FIG. 2 shows a set of images A to B illustrating concepts of target area, intermediate area and extraction area. An input area 201 is used by data analytics for objects detection (A). An extract area 203 is a set of mathematical parameters to be extracted from the combined set of input area and detected objects or from the combined set of multiple input areas and multiple detected objects. The quantity of extract areas EAQ may be determined in accordance with Equation (1): see FIG. 16.

In Equation (1) (see FIG. 16), 'rule' may be the result of objects filtering by predefined parameters, or result of objects in connection to the group, or result of prediction or reconstruction, or external user preference, or result of automatic or pseudo-automatic selection done by state machines included in present disclosure.

The target area 202 is a set of mathematical parameters to be extracted from the combined set of input area and detected objects or from the combined set of multiple input areas and multiple detected objects. The target area 202 is equal to extract area 203 if processing includes input data for single moment of time and input data not collected during several moments of time. If input data is collected during several moments of time, the extract area 203 will approach to the parameters of the target area 202. The number of steps to complete that approach depends from many parameters, such as: sensor characteristics, and or the number of sensors, and or algorithm state machines processing, and or predefined rules for objects and or groups. The complex behavior and non predictable nature of objects in the FOV may produce new parameters and particular sizes for each moment of time. The target area may be highly unstable as a result.

The intermediate area 206 is introduced. See FIG. 2 (B) for example. We assume the current moment of time is depicted as area 204 and the previous moment of time as area 201. See FIG. 2 (A) for example. The current target area is 207 and previous target area is 202. The intermediate area 206 is equal to target area 202. The extract area 205 will approach to the parameters of the intermediate area 206.

Figure 3:
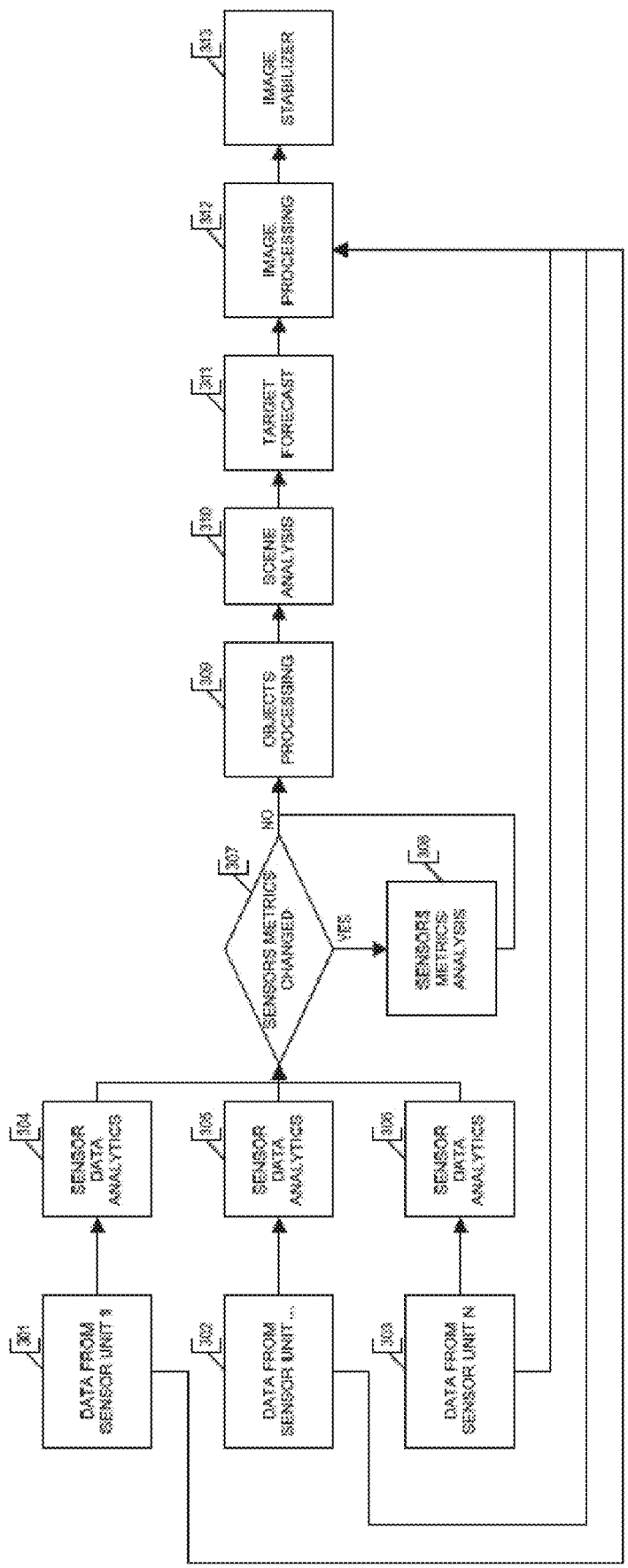
FIG. 3 shows a block diagram schematically illustrating sensors array with data analytics and data processing, in an example.
Figure 4:
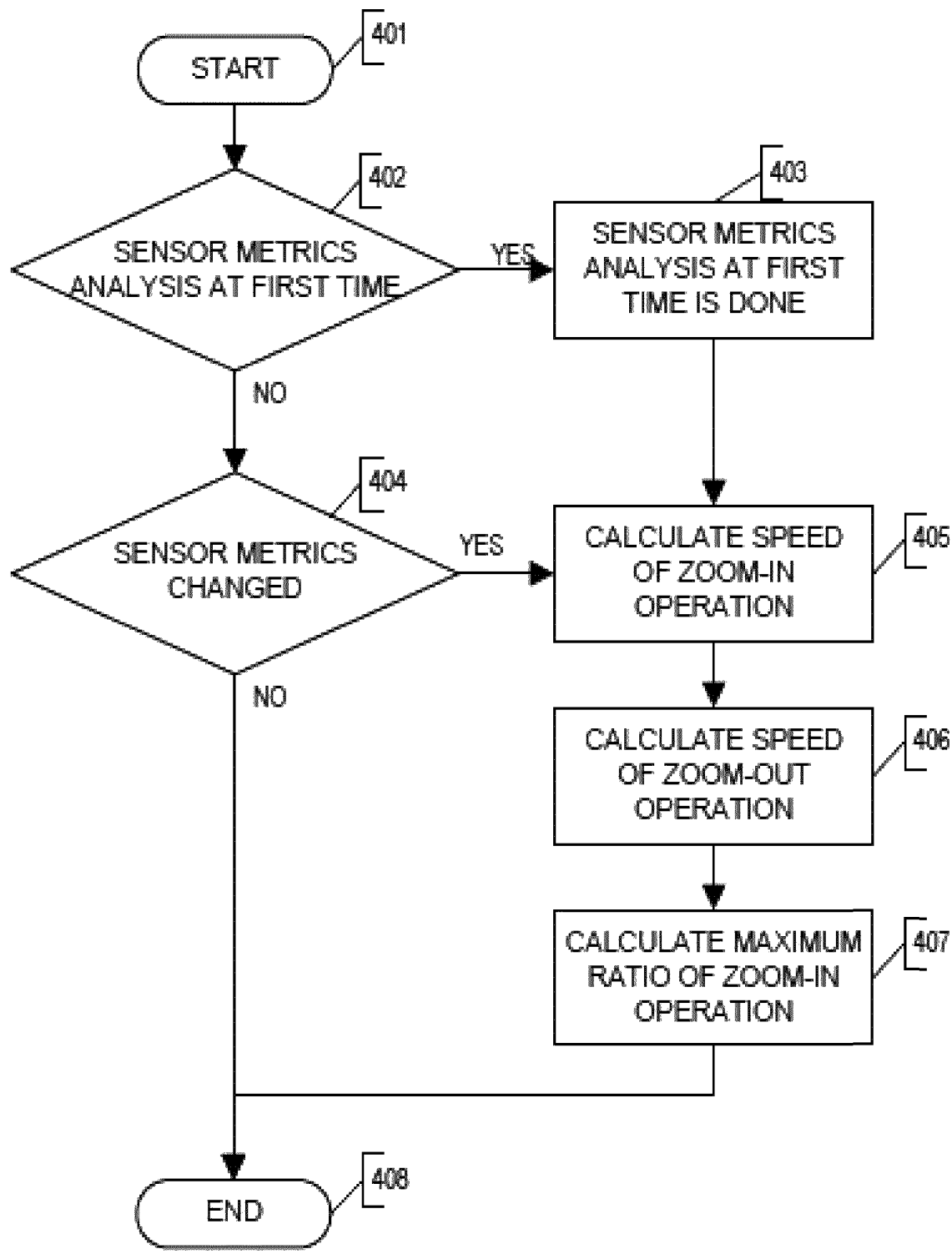
FIG. 4 shows a block diagram schematically illustrating analysis of sensor metrics, in an example.

FIG. 3 shows an example of data flow from a sensor array 301, 302, and 303. In a data flow from a sensor array, a main purpose may be extraction of a region. This may be done for a single image, or for a video sequence. A sensor unit may be present in a digital camera, a smartphone, for example. The sensors variety may include sensors in visible spectra and/or sensors in infra red spectra (e.g. for security applications) and/or thermal sensors and/or temperature sensors and/or ultra sonic sensors (e.g. for sensing distance or proximity) and/or sensors in non-visible spectra and/or sensors of acceleration detection. If the sensor system is not working temporarily, an initialization process may be performed, such as is shown in FIG. 4, for example. The sensor data analytics 304, 305 and 306 are external blocks. The sensor data analytics provides as output the region of interest metrics. The metrics may include an information about region coordinates, and or angle, and or type, and or size, and or name, and or speed, and or acceleration, and or vector of movement. The sensor metrics analysis 308 may perform calculations related to frame per second parameter and or size of frame and or number of sensors and or EXIF information (Standard of the Camera & Imaging Products Associates, CIPA DC 008-Translation 2012, Exchangeable image file format for digital still cameras, Exif version 2.3). For example, if all sensors stop providing useful data, a zoom-in should be stopped; the frames per second (fps) setting affects the zoom speed. The objects processing 309 performs filtration of redundant information and or reconstruction of partially and or completely lost regions of interest by performing analysis of region structure and or behavior in time scale and or speed and or coordinates in 2D and or 3D space. In an example, this may be performed in airport security. The scene analysis 310 performs an intelligent selection of the best extraction method. In an example, face recognition ('yes' or 'no') is performed. Grouping may be performed, such as by size or by type. Group reconstruction may be performed: for example an ambulance system may be grouped as an ambulance vehicle plus a person (e.g. its driver). For example, in a security application (e.g. in a street, in an airport, or in a home) luggage may disappear from a person, which may indicate that something is wrong. A scene analysis may be adapted to analyze fast movement, for example in a sport scene. The target forecast 311 performs an intelligent calculus of the target area. The image processing 312 performs a set of manipulations related to target area, extract area and intermediate area. The image stabilizer 313 removes undesirable effects produced by algorithms themselves or external causes. In an example, this is to optimize cropping or scaling (e.g. zooming), not a physical stabilization alone. For breathing by the holder of a video or photo device, a smoothing equation may need to be applied. For vehicle judder for a vehicle with a video or photo device, a smoothing equation may need to be applied. A cropped area moves with respect to an object, hence the cropped area needs to be stabilized.

In an alternative image processing, a video right camera video stream may be recorded, and a video left camera video stream may be recorded. These two video streams may be combined to make one video. A blank spot between the two video streams may be filled in using image processing.

In another alternative image processing, images from a low resolution camera may be processed to make a high resolution image, and even to make a super high resolution image. This may involve deconvolution of finite pixel size from a series of images, to produce a higher resolution image, as would be clear to one skilled in the art.

FIG. 4 shows an example of analysis of the sensor metrics. The sensor may include the metrics. These metrics may have the same values during a period of time, but also these metrics may have different values for every particular moment of time. The number of sensors also may vary. For example, the sensor metrics includes: focal length, aperture, frame per second output rate, image dimensions, time, position and color information. In an example, analysis of the sensor metrics 405, 406, and 407 shall be executed at least once. The block 403 corresponds to that and will be executed once. If the number of sensors is changed or some of sensor metrics are changed 404 the analysis 405, 406, and 407 need to be repeated.

In an example, a speed of a zoom in operation is consistent with the number of frames per second (fps), a frame size, and takes into consideration if the position of the camera is changing. For example, from a view one can estimate x, y, z coordinates, but if a camera rotates (e.g. as determined by sensors), a new transformation is needed.

Figure 5:
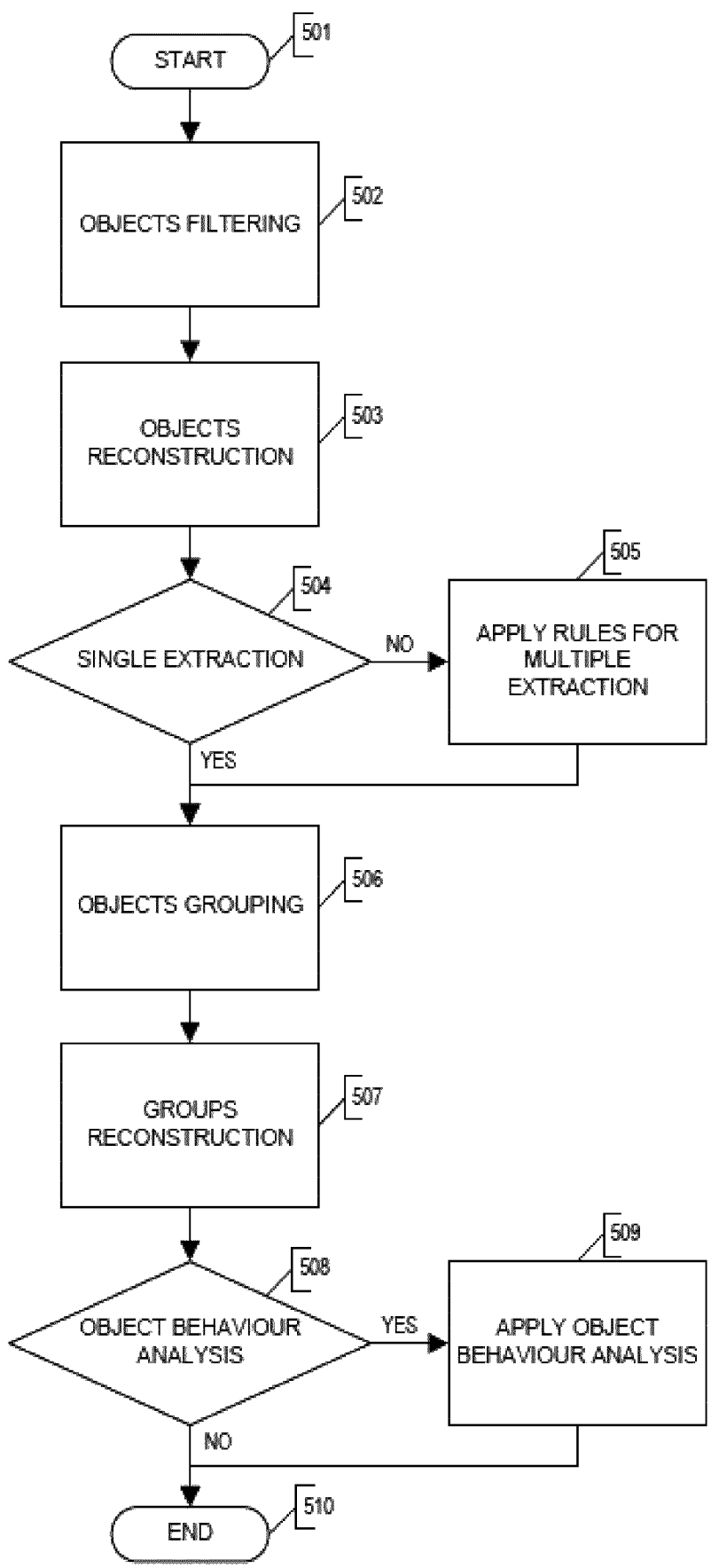
FIG. 5 shows a block diagram schematically illustrating objects processing, in an example.

FIG. 5 shows an example of a detailed explanation of the block 309. The block 502 performs the object filtering. The property of filter and rules may or may not include: the size of object, the angle of object, coordinates of object, type of object, name of object, speed of object, vector of movement of object, and acceleration of object. The block 503 performs the object reconstruction. The analytics system may have the errors such as absence of detected objects, the wrongly predicted or calculated parameters of detection object. It is easy to interrupt the normal workflow because of e.g. fast-moving clouds or branches of trees. The reconstruction is easy to predict by using the well-known characteristics of objects. For example: the speed of a walking human is easy to predict, the vector of movement is easy to predict by analyzing the trajectory, and the missing parts of detection is easy to predict by using structural properties. The number of extraction areas may vary. The rules to make decision 505 shall define the relationships between detected objects. For example: first extract area consists only of faces and second extract area consists only of the full figures. The object grouping 506 combine several objects or single object in a group. The block 507 performs reconstruction of group based on predicted characteristics of the group. For example: the human must have head, and hands, and face. The block 509 performs analysis of the object properties in the time and or space domains.

Figure 6:
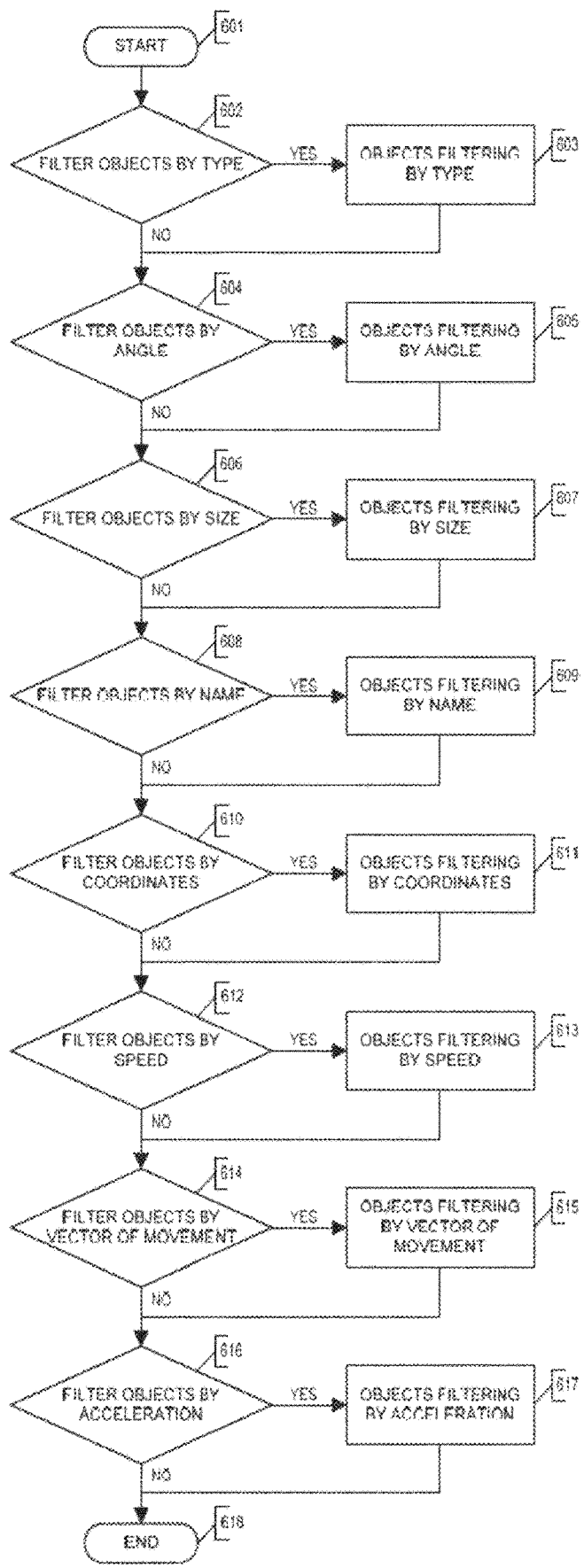
FIG. 6 shows a block diagram schematically illustrating objects filtering, in an example.

FIG. 6 shows an example of a procedure of objects parameters verification and redundant objects removal. The block 603 passes certain types of objects. For example: do not process objects with type face and hands. The block 605 passes objects with certain angle values. For example: do not process objects with yaw angle >45 degree and pitch angle <90 degree. The block 609 passes objects with certain names. For example: do not process objects related to object with name CAR N1 and CAR N3. The block 611 passes objects with certain position in the space domain. For example: do not process objects with position x<10 and y>20 and or z<=15. The block 613 passes objects with certain speed. For example: do not process objects with speed >5 km/h. The block 615 passes objects with certain vector of movement. The block 617 passes objects with certain acceleration. For example: do not process objects with acceleration >1 m/s^2.

Figure 7:
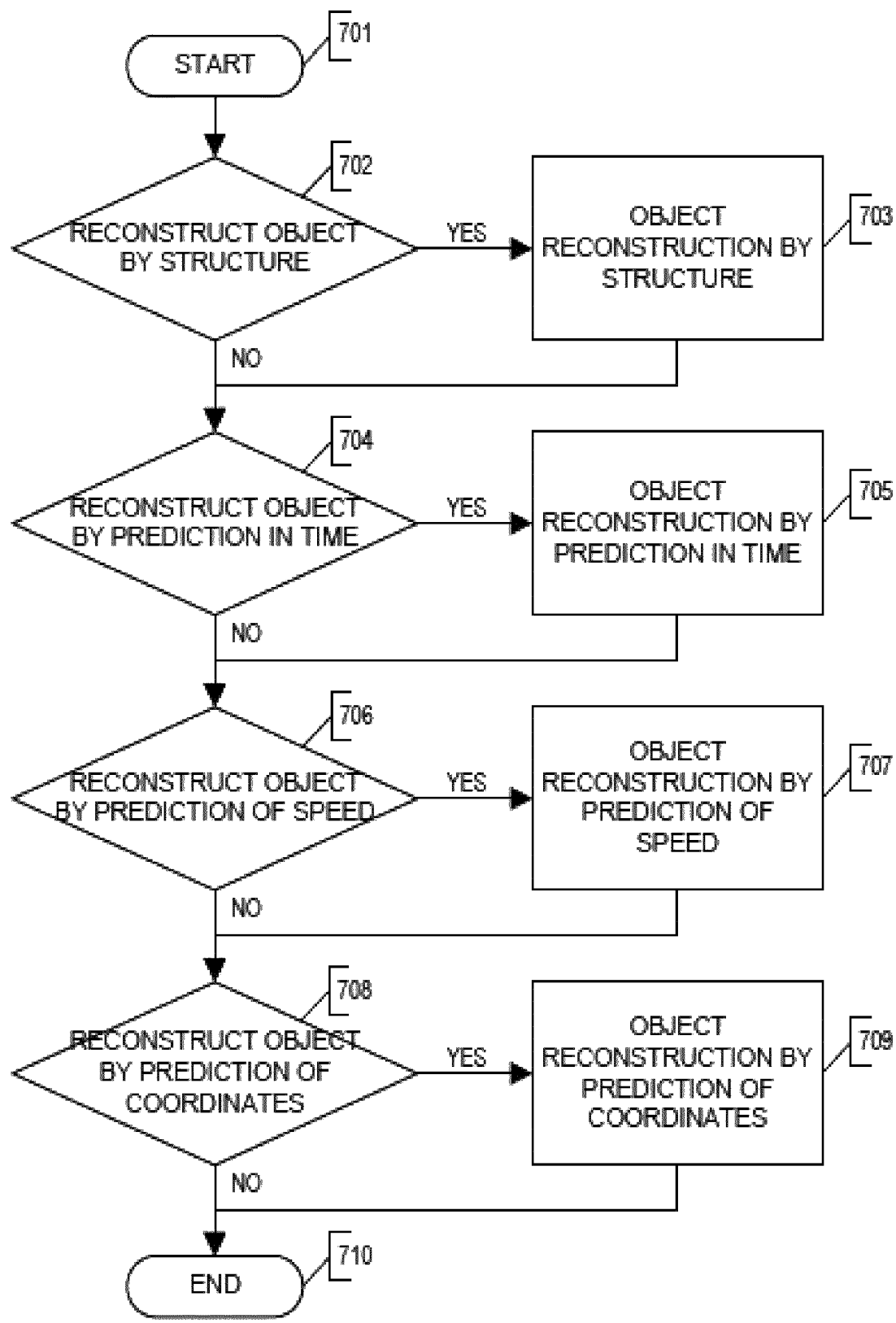
FIG. 7 shows a block diagram schematically illustrating objects reconstruction, in an example.

FIG. 7 shows an example of the procedure of prediction and/or reconstruction of the lost parameters and/or procedure of prediction and/or reconstruction of the lost objects. The block 703 performs prediction and reconstruction by using predefined structure. For example: input object is face, the structure for prediction is face with eyes, the output is object face and objects eyes. The block 705 performs prediction and reconstruction by using time domain. For example: the object parameters are quite stable during several moments of time, but in some particular moments of time they are not. That is easy to assume the parameters might be the same for all period of time and this particular moment is kind of error. The block 707 performing prediction and reconstruction by using speed parameter. For example: by using size, direction and speed that is easy to predict the future coordinates or missing coordinates of object. The block 709 performs prediction and reconstruction by using coordinates. For example: the object position in a particular moment of time is quite different to its position in the previous moment of time, and because the object type is face, thus the coordinates are wrong and need to be replaced with coordinates from the previous moment of time.

Figure 8:
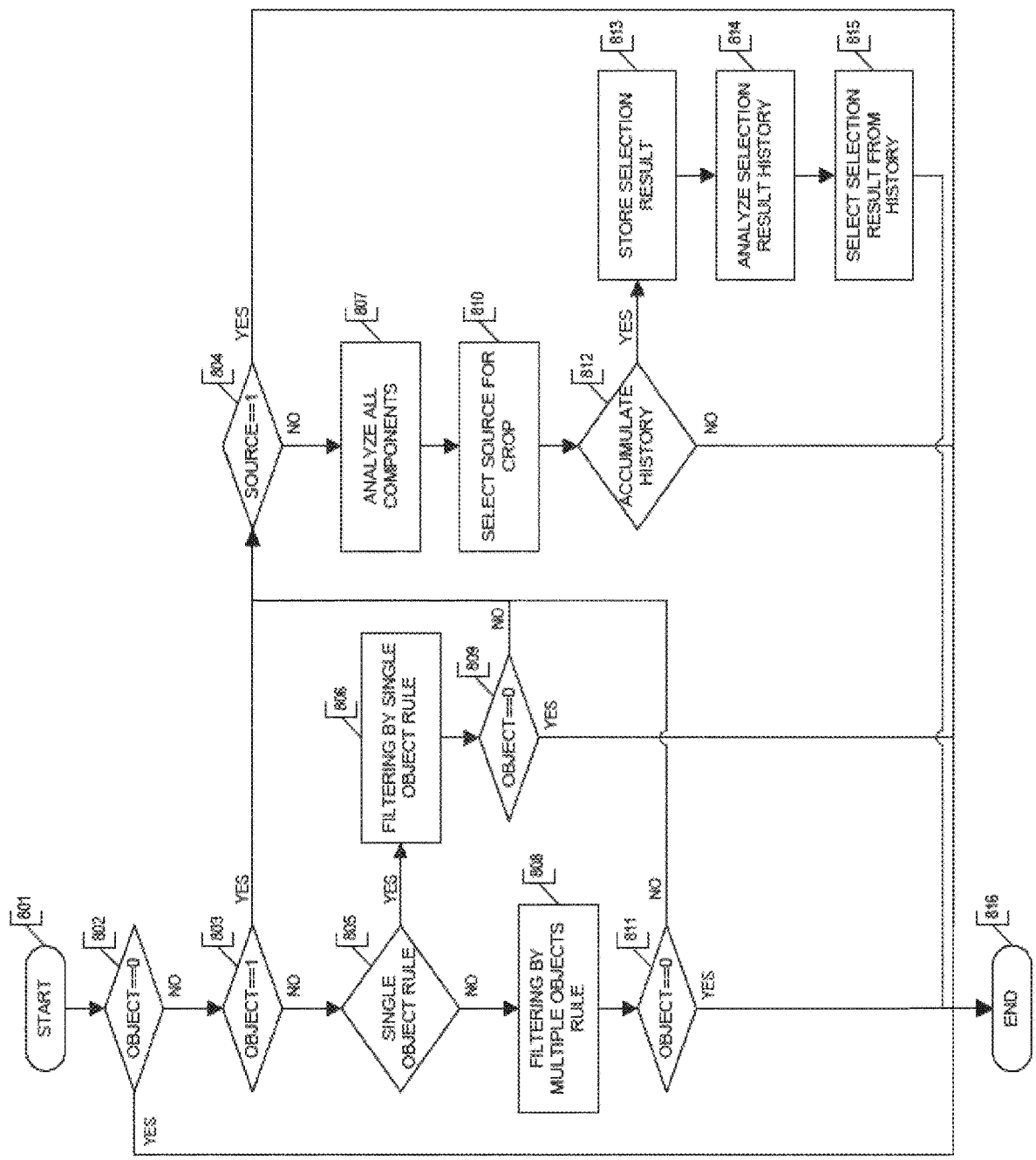
FIG. 8 shows a block diagram schematically illustrating object behavior analysis, in an example.

FIG. 8 shows an example of object behavior analysis. The processing selects the source of input data within array 301, 302, 303 for future processing as the most suitable for predefined patterns source and or processing selects the several sources of input data within array 301, 302, 303. In general, the analysis itself is a filtering of the objects based on predefined object behavior patterns. Such patterns may include the position and angle for single object in some limits. The block 802 performs a condition check. If no objects are present the algorithm flow goes to the end 816. The block 803 performs comparison with '1'. If the number of objects is one, then the block 804 will be executed. If number of sources is one, then the algorithm flow going to the end 816. The block 805 performing condition check. The single object rule means the rule for all objects with no preference. Every object is independent and have right to be filtered separately from all others objects 806. The multiple object rule means the rule for all objects with predefined links between objects 808. The condition check 809 and 811 verifying the number of objects after filtering. If the number of objects after filtering equal zero, then the algorithm flow going to the end 816. The block 807 performs score calculations for all objects after filtering. These objects have candidates with best and worst scores. The source with maximum number of best scores will define the source for selection 810. Selected source will be most important source for next processing. If history of selection is a point of interest, then the result of selection will be stored 813. The analysis of history 814 performing calculations by using selection history. For example: averaging, median, or mean approximation. The block 815 performing the final selection and sensing message to all next blocks. The message defines the most important input source.

Figure 9:
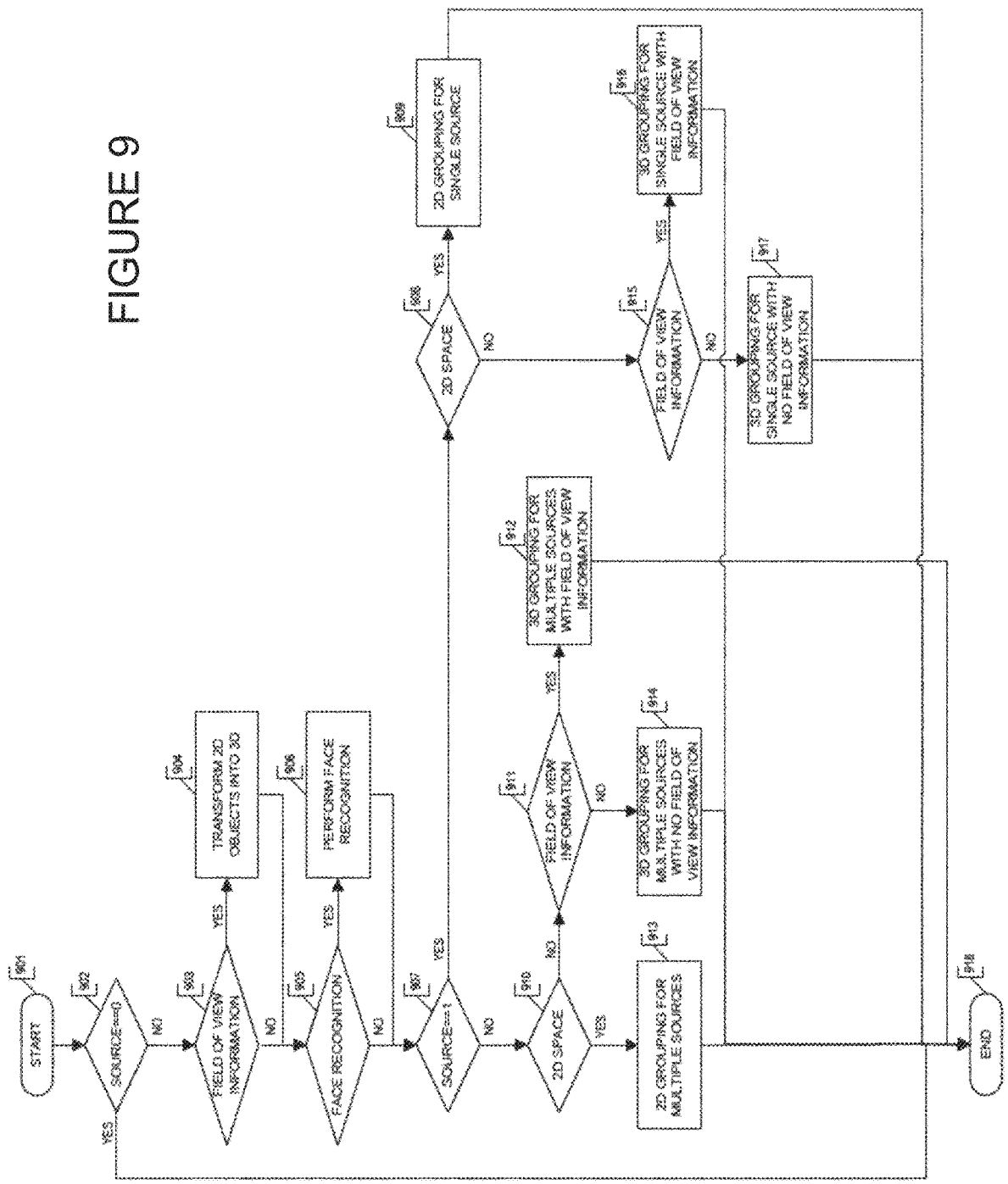
FIG. 9 shows a block diagram schematically illustrating objects grouping with single and multiple input sources, in an example.

FIG. 9 shows an example of a procedure of object grouping. The object grouping is a creation of links between objects and unification of these objects under a new name. For example: object eyes and object lips may be unified as a group face. If the number of sources 902 is equal to zero, then algorithm flow goes to the end 918. If FOV metrics is present 903, then transform 2D objects to the 3D objects. The transformation may be determined in accordance to Equation (2): see FIG. 16.

In Equation (2) (see FIG. 16), 'M real world' is the transformation matrix from the source coordinates to real world coordinates.

The matrix of transformation is a matter of choice. The transformation may convert object coordinates to another convenient mathematical representation. The face recognition 906 is an external block. The output is a value assigned to particular object. For example: the output is a name of the real person and object assigned to name "Ellis". The number of sources is quite important. If the number of sources 907 is equal to one, then the block 908 will be executed. If objects metrics assigned to 2D space, then the block 909 is executed. The grouping 909 performs unification of objects in 2D space for single source. If objects metrics assigned to 3D space and FOV metrics is present, then the block 916 is executed.

The grouping 916 performs unification of objects in 3D space for a single source with FOV metrics present. 3D coordinates may be transformed to real world coordinates or any other convenient coordinates. If FOV information is not present, then the block 917 is executed. The grouping 917 performs unification of objects in 3D space for single source with FOV metrics not present. 3D coordinates is coordinates of camera 3D space and not transformed to real world coordinates or any other convenient coordinates. If number of sources >1, then the block 910 is executed. If an object is present in 2D space, then the block 913 is executed. The grouping 913 performs unification of objects in 2D space for multiple input sources. The grouping for multiple input sources may combine the objects from different sources as a single object. For example: result of grouping is group 'face' with parents 'face N1' and 'face N2', where is 'face N1' is object from source N1 and 'face N2' is object from source N2. The grouping for multiple input sources may not combine the objects from different sources as single object. For example: result of grouping is group 'face N1' with parent 'face N1' is object from source N1 and group 'face N2' with parent object 'face N2' is object from source N2. If FOV information is present, then the block 912 is executed. The grouping 912 performs unification of objects in 3D space for multiple input sources with FOV metrics present. If FOV information is not present, then the block 914 is executed. The grouping 914 performs unification of objects in 3D space for multiple input sources with FOV metrics not present.

Figure 10:
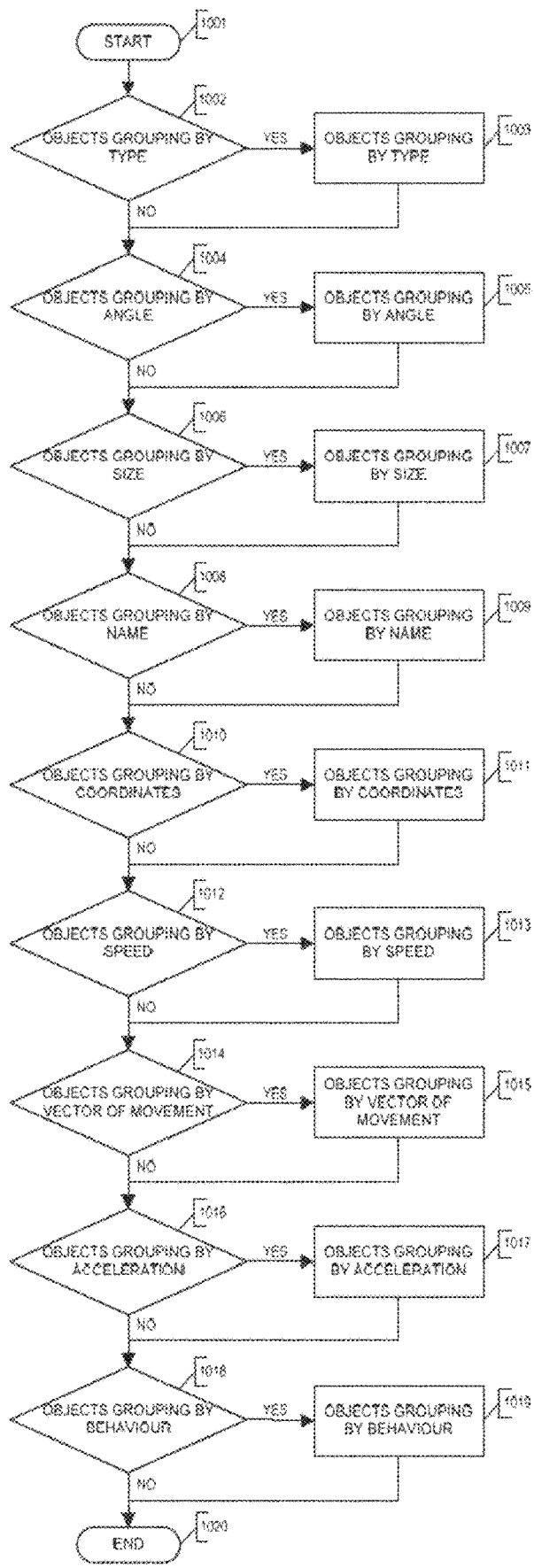
FIG. 10 shows a block diagram schematically illustrating general conception of the objects grouping, in an example.

FIG. 10 shows an example of a general conception of objects grouping based on object metrics. The algorithm depicted in FIG. 10 may be included as part of grouping mentioned above as 909, 913, 914, 912, 916, and 917. The grouping by using type 1003 may unify objects with same type as single group. For example: all objects with type 'face' may be unified to single group 'face'. The grouping by using type 1003 may unify objects with different type as single group. For example: object 'face' and object 'hand' unified to single group 'human'. The grouping by using angle 1005 may unify objects with some predefined angle rules. For example: objects with yaw angle >45 degree and <90 degree will be unified as single group. The grouping by using size 1007 may unify objects with some predefined size rules. For example: objects with width >45 and height <90 will be unified as single group. The grouping by using name 1009 may unify objects with some predefined name rules. For example: objects with name 'car N1' and name 'car N2' will be unified as single group. The grouping by using coordinates 1011 may unify objects with some predefined coordinates rules. For example: all objects in area radius 15 with center x=10 and y=20 and z=30 will be unified as single group. The grouping by using speed 1013 may unify objects with some predefined speed rules. For example: all objects with speed >30 km/h will be unified as single group 'cars'. The grouping by using vector of movement 1015 may unify objects with some predefined vector of movement rules. For example: all objects with vector of movement from south to west will be unified as single group 'pedestrians'. The grouping by using acceleration 1017 may unify objects with some predefined acceleration rules. For example: all objects with acceleration >1 m/s^2 and <2 m/s^2 will be unified as single group 'humans'. The grouping by using behavior 1017 may unify objects with some predefined behavior rules. For example: all objects 'face' with number >10 will be unified as single group 'crowd'.

A principle is to use many categories, so as to provide a system that is robust against noise or spurious data. For example, in a street scene, if a cloud suddenly blocks the sun, or if a cloud moves and the sun is suddenly unblocked, the contrast can change very fast. Use of object filtering, and/or object reconstruction, as shown in FIG. 6 and in FIG. 7 for example, may help to provide a system that is robust against noise or spurious data.

Figure 11:
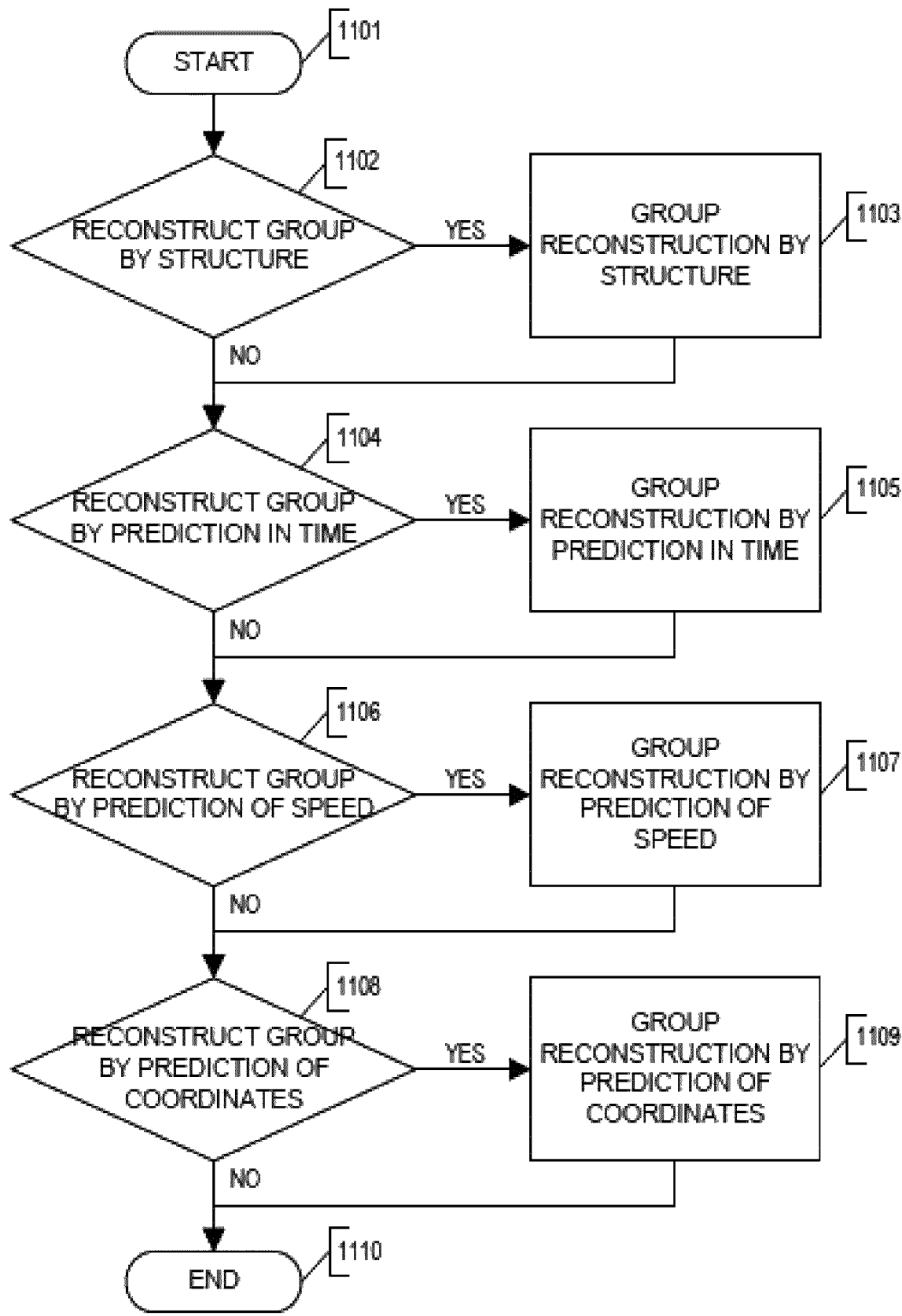
FIG. 11 shows a block diagram schematically illustrating group reconstruction, in an example.

FIG. 11 shows an example of group reconstruction. Group reconstruction performs prediction and creation of group parts. The group reconstruction by using structure 1103 may use predefined structure as basis for prediction. For example: group 'human' may have object parents 'head' and 'full body', then as result the object 'hand' is predicted, created and included to group 'human'. The group reconstruction by using time 1105 may use predefined time patterns as basis for prediction. For example: from the current moment of time the group "human' do not have part object 'head', that is expected as data analytics have limits on minimum detected size, but it is possible to predict missing part. As result the object 'hand' is predicted, created and included to group 'human'. The group reconstruction by using speed 1107 may use predefined speed patterns as basis for prediction. For example: group 'human' have parent objects 'head' and 'full body', by estimating speed as speed of running human, that is easy to predict missing objects 'hands'. As result the objects 'hands' is predicted, created and included to group 'human'. The group reconstruction by using coordinates 1109 may use predefined coordinates patterns as basis for prediction. For example: the group 'human' coordinates is near to bottom of input source size, as result the object 'hand' is impossible to have, because no data is present for data analytics. As result the objects 'hands' is predicted, created and included to group 'human'.

Figure 12:
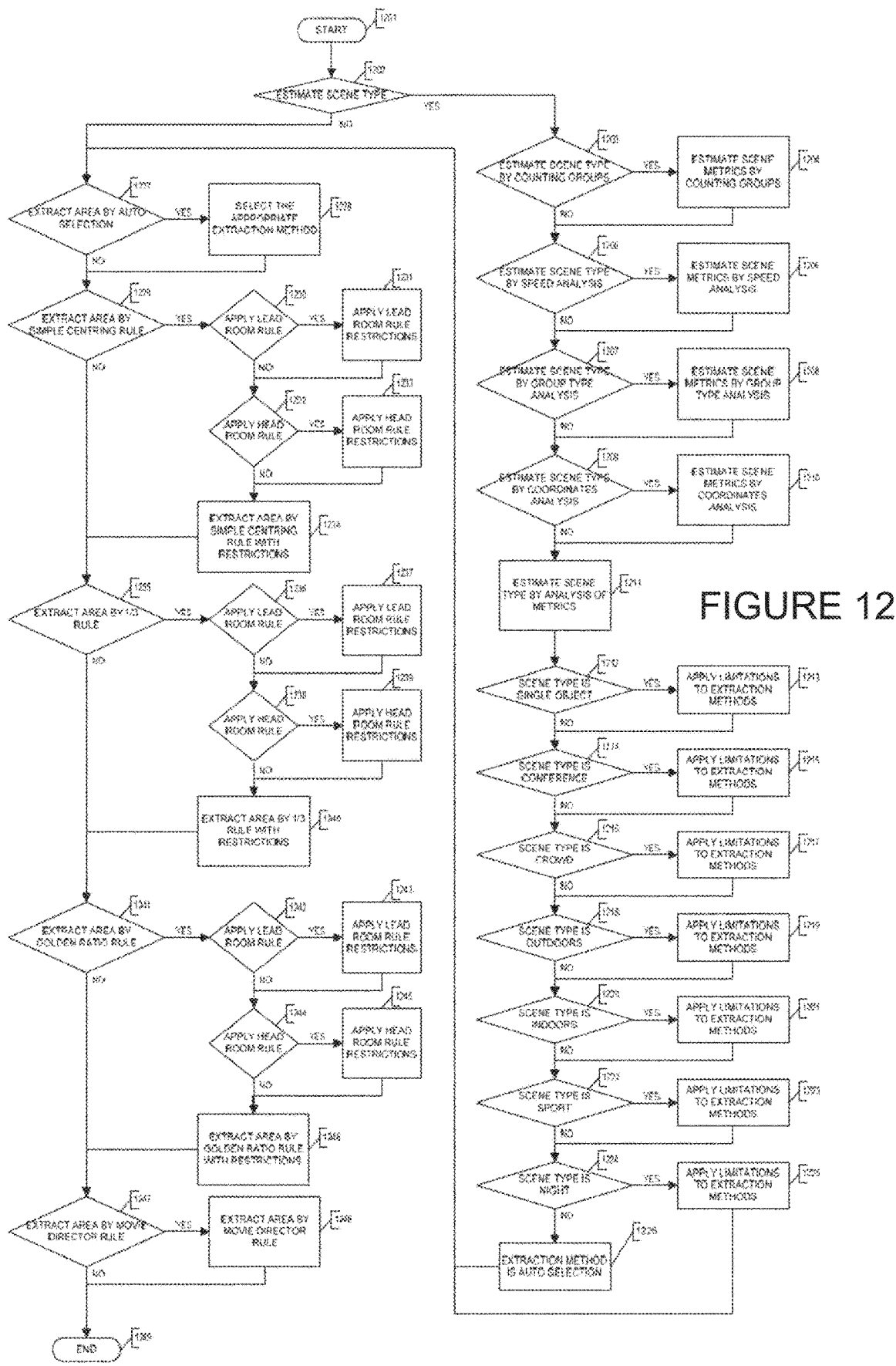
FIG. 12 shows a block diagram schematically illustrating scene analysis, in an example.

FIG. 12 shows an example of a scene analysis procedure. A scene analysis procedure may include two parts: the scene type detection part and extract method selection part. The scene analysis calculates decision and limitation values by using object and group metrics. When estimating a scene type 1202, the scene type may be for example a street scene, a subway scene, or a department store scene. The estimation of the scene type metrics (STM) by counting groups 1204 may use the number of groups as predefined rule. For example: the number of groups is one and group type is 'human', then STM 'single object' is '1' and STM 'conference' is zero. In the real-world the complex object behavior happens quite frequently. The STM equal to integer value is rare. The STM may be determined in accordance to Equation (3): see FIG. 16.

In Equation (3) (see FIG. 16), 'response' is the integer value of a result of a decision, and 'w' is a weight coefficient.

The estimation of the STM by speed analysis 1206 may use the speed patterns as predefined rule. For example: the group 'human' with biggest weight have speed >10 km/h and <20 km/h, then STM 'single object' is 0, STM 'conference' is 0, and STM 'sport' is 1. The estimation of the STM by type analysis 1208 may use the type patterns as predefined rule. For example: the 8 groups 'face' and 2 groups 'hand', then STM 'single object' is 0, STM 'crowd' is 0.8, and STM 'sport' is 0. The estimation of the STM by coordinates analysis 1210 may use the coordinates patterns as predefined rule. For example: the 8 groups 'face' located in the middle part of input scene, then STM 'single object' is 0, STM 'conference' is 0.8, and STM 'sport' is 0. The block 1211 taking in account all previously estimated STM's. The method to select and analyze these values may vary. For example: select the STM after sorting all STM values and select of the STM with biggest value. The scene type is a signature of presence of STM. The relationships between different STM's may describe some type of scene with some level of confidence. For example, scene type is: single object, or conference, or crowd, or indoors, or outdoors, or indoors, or sport, or night. The scene type may have direct influence to extract method selection. The influence may define the mathematical limitation for extraction method. These limitations may include the thresholds and patterns based on objects/groups metrics. The limitation may define the number of extract areas, size and position of extract area. The limitations defined in blocks 1213, 1215, 1217, 1219, 1221, 1223, and 1225. A limitation could be a limitation on cropping in which the image is just to be centered, for example. If scene type is not defined, the block 1226 select scene type as 'unknown' and as consequence the block 1228 is performed. The procedure of selection may analyze the type of groups or quantity, by using some basic judgments. For example: group type is 'human', number of groups is 1, then extract area by using 'golden ratio' rule; group type is 'human', number of groups is 2, then extract area by using '1/3 ratio' rule. The 1/3 rule applied in the block 1240: in an example, two people are 'centered' with one person 1/3 of the way across the image, and the other person 2/3 of the way across the image. In another example, the eyes of a face are placed 1/3 down from the top of the image. The rule of thirds is a "rule of thumb" or guideline which applies to the process of composing visual images such as designs, films, paintings, and photographs. The guideline proposes that an image should be imagined as divided into nine equal parts by two equally spaced horizontal lines and two equally spaced vertical lines, and that important compositional elements should be placed along these lines or their intersections. Proponents of the technique claim that aligning a subject with these points creates more tension, energy and interest in the composition than simply centering the subject.

The 'golden ratio' rule is applied in the block 1246. In mathematics, two quantities are in the golden ratio if their ratio is the same as the ratio of their sum to the larger of the two quantities. The figure on the right illustrates the geometric relationship. Expressed algebraically, for quantities a and b with a>b>0. The lead room rule is applied in the block 1231. In photography and other visual arts, lead room, or sometimes nose room, is the space in front, and in the direction, of moving or stationary subjects. Well-composed shots leave space in the direction the subject is facing or moving. When the human eye scans a photograph for the first time it will expect to see a bit in front of the subject. For example, moving objects such as cars require lead room. If extra space is allowed in front of a moving car, the viewer can see that it has someplace to go; without this visual padding, the car's forward progress will seem impeded. The head room rule is applied in the block 1233. In photography, headroom or head room is a concept of aesthetic composition that addresses the relative vertical position of the subject within the frame of the image. Headroom refers specifically to the distance between the top of the subject's head and the top of the frame, but the term is sometimes used instead of lead room, nose room or 'looking room' to include the sense of space on both sides of the image. The amount of headroom that is considered aesthetically pleasing is a dynamic quantity; it changes relative to how much of the frame is filled by the subject. The rule of thumb taken from classic portrait painting techniques, called the "rule of thirds", is that the subject's eyes, or the center of interest, is ideally positioned one-third of the way down from the top of the frame. The movie director rule is applied in the block 1248. The rule is for replicating the style of film makers.

If scene detection is not required 1202, then only extract method selection is used. If automatic selection is used 1227, then the intelligent selection applied 1228.

In an example, a crop may be focused on one person. In an example, a crop may be focused on many people with guns. In an example, many crops may be focused on many people with guns.

Figure 13:
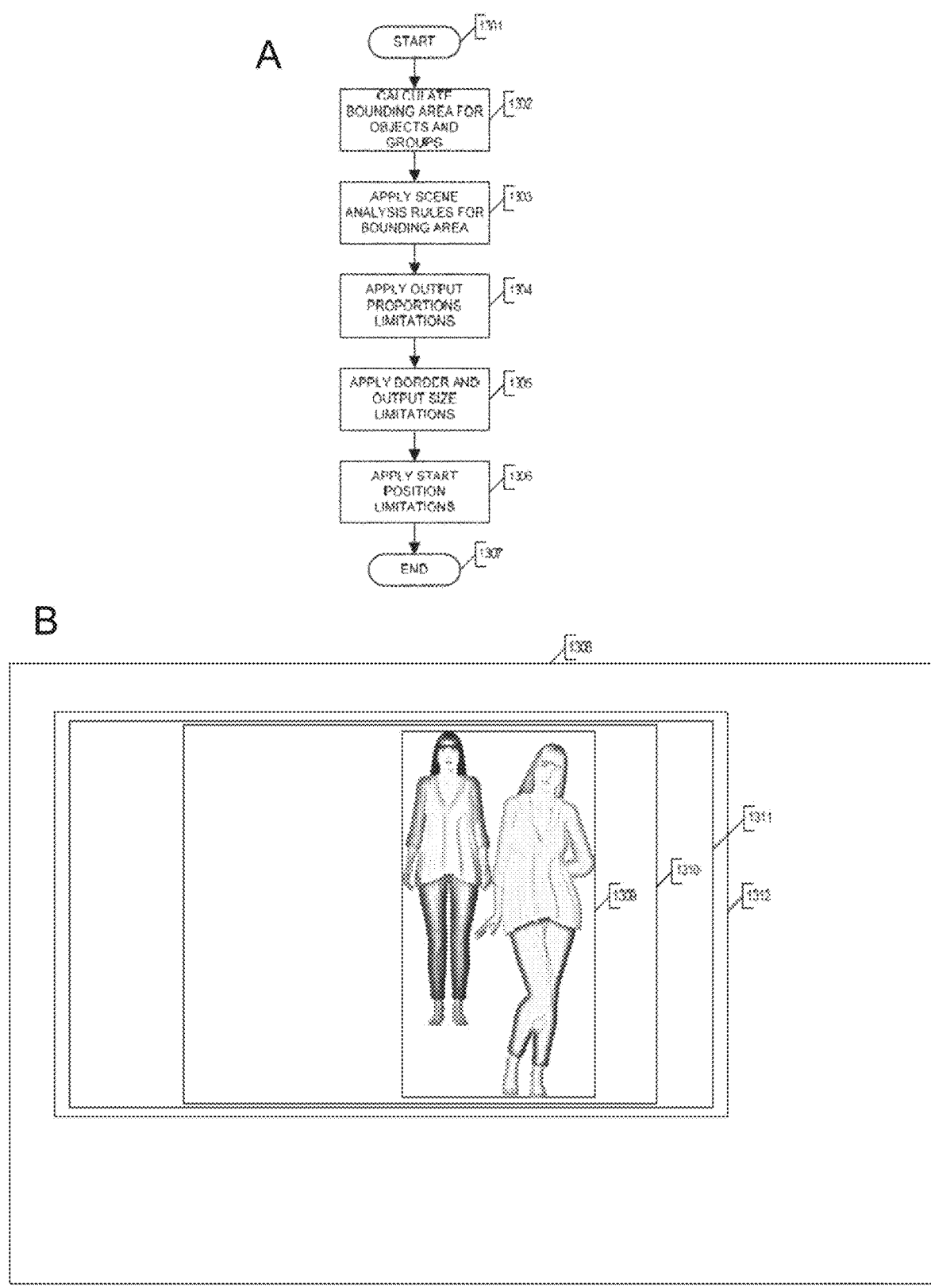
FIG. 13 shows a block diagram schematically illustrating target area calculation, in an example.

FIG. 13 parts A to B shows an example of target area 'a' calculation. The block 1302 performs calculation of the bounding area 1309. The bounding area may be defined as regular polyhedron in 3D space or as polygon in 2D space. The bounding area includes all objects and groups to be extracted. The block 1303 applies rules of extract area as explained in relation to FIG. 12 to position and size of the bounding area 1309. As a result, the new area 1310 is produced. The extract area might have some proportions or aspect ratio. For example: the most common aspect ratios used today in the presentation of films in cinemas are 1.85:1 and 2.39:1. Two common aspect ratios are 4:3 (1.33:1), the universal video format of the 20th century, and 16:9 (1.77:1), universal for high-definition television and European digital television. Other cinema and video aspect ratios exist, but are used infrequently. If aspect ratio is defined, then the area 1310 is transformed to the area 1311. To achieve aesthetic quality of extract area, the border area needs to be added to the area 1311. As result the area 1312 is produced. If there exists a limit to minimum size of the extract area, then the block 1305 will limit the size of area 1312 to predefined minimum size of the extract area.

Figure 14:
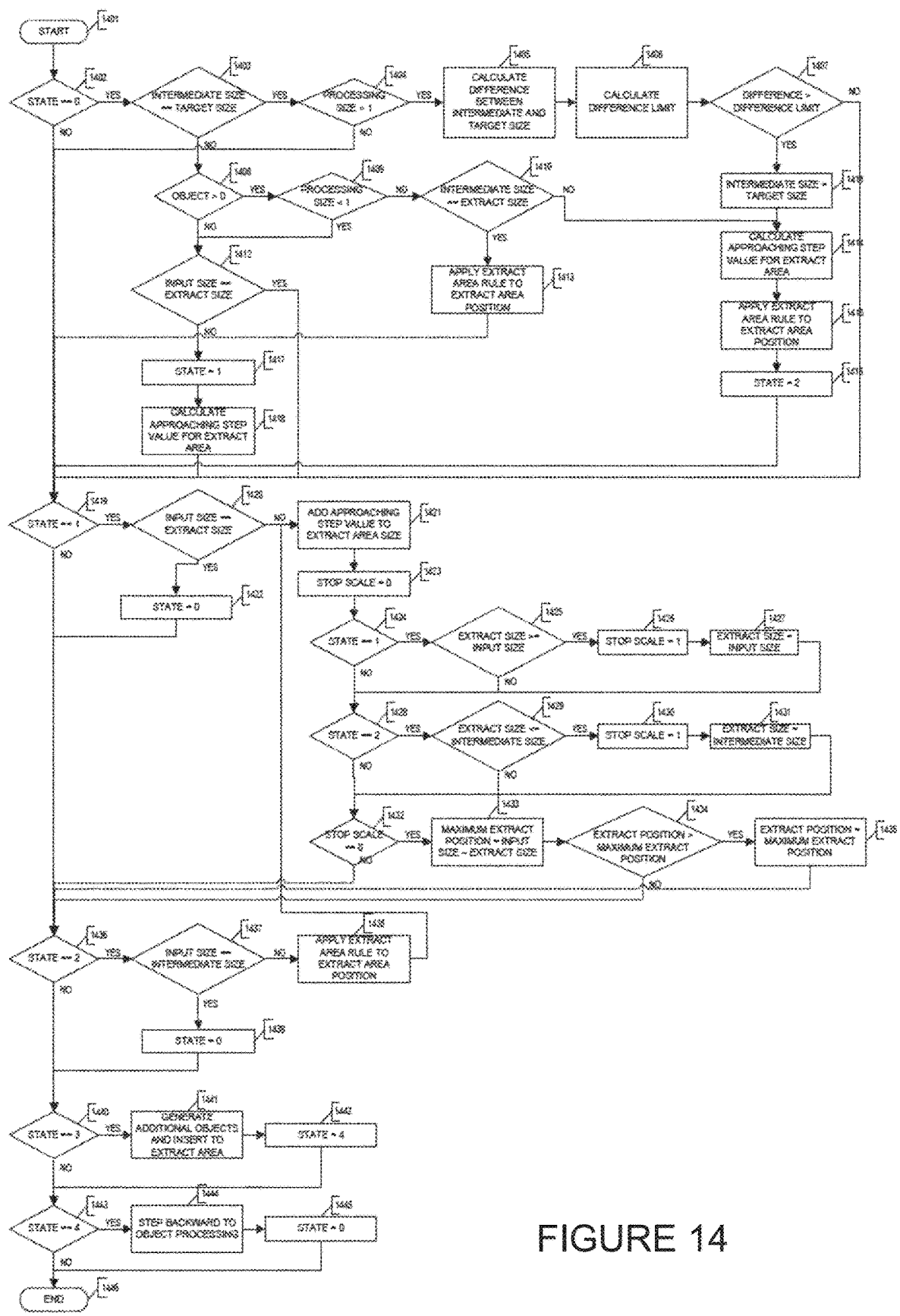
FIG. 14 shows a block diagram schematically illustrating image and data processing, in an example.

FIG. 14 shows an example of image and data processing. The style of state machine with states 1402, 1419, 1436, 1440, 1443 describes the relationships, between target area 207, extract area 205, intermediate area 206, and input area 201. The state equal zero means there is no processing applied and all areas are not defined. The processing applied to video sequence may be described as continuous scaling between extract area 205 and area 1312. The number of steps or 'processing size' to produce scaling is depicted as block 1404 and 1409. The value of processing size may be calculated in the block 405 and 406. The block 1408 performs condition check for number of objects or groups. The block 1418 calculating the approaching step value ASV. The ASV may be determined in accordance to Equation (4): see FIG. 16.

In Equation (4) (see FIG. 16), 'a' is the size of input area 201; 'b' is the size of intermediate area 206, and 'c' is the processing size value.

The block 1418 is used to calculate the difference between intermediate area 206 and target area 207. The difference DIT may be determined in accordance to Equation (5): see FIG. 16.

In Equation (5) (see FIG. 16), 'a' is the size of target area 207, and 'b' is the size of intermediate area 206.

The intermediate area 206 fluctuations may be limited by setting a threshold. The value of the threshold is calculated as a difference limit in the block 1406. The difference limit DL may be determined in accordance to Equation (6): see FIG. 16.

In Equation (6) (see FIG. 16), 'a' is the size of intermediate area 206, and 'w' is a weight coefficient.

The extract area rule is applied in the blocks 1413 and 1415. The state equal 1 means the procedure of approaching of the input area to intermediate area. The state equal 2 means the procedure of approaching of the intermediate area to input area. The procedure of continuous scaling may proceed if 'stop scale' value equal 0 as depicted in 1423. The procedure of continuous scaling may not proceed if 'stop scale' value equal 1 as depicted in 1426 and 1430. The extract area 205 position may exceed the dimensions of input area 201. To prevent position error the block 1433 and 1435 is applied. The block 1441 inserting objects, and or silhouettes, and or text, and or special markers to extract area 205. The generations of the new objects in present disclosure may lead to step backward into the block 501. The step backward depicted as block 1444.

Figure 15:
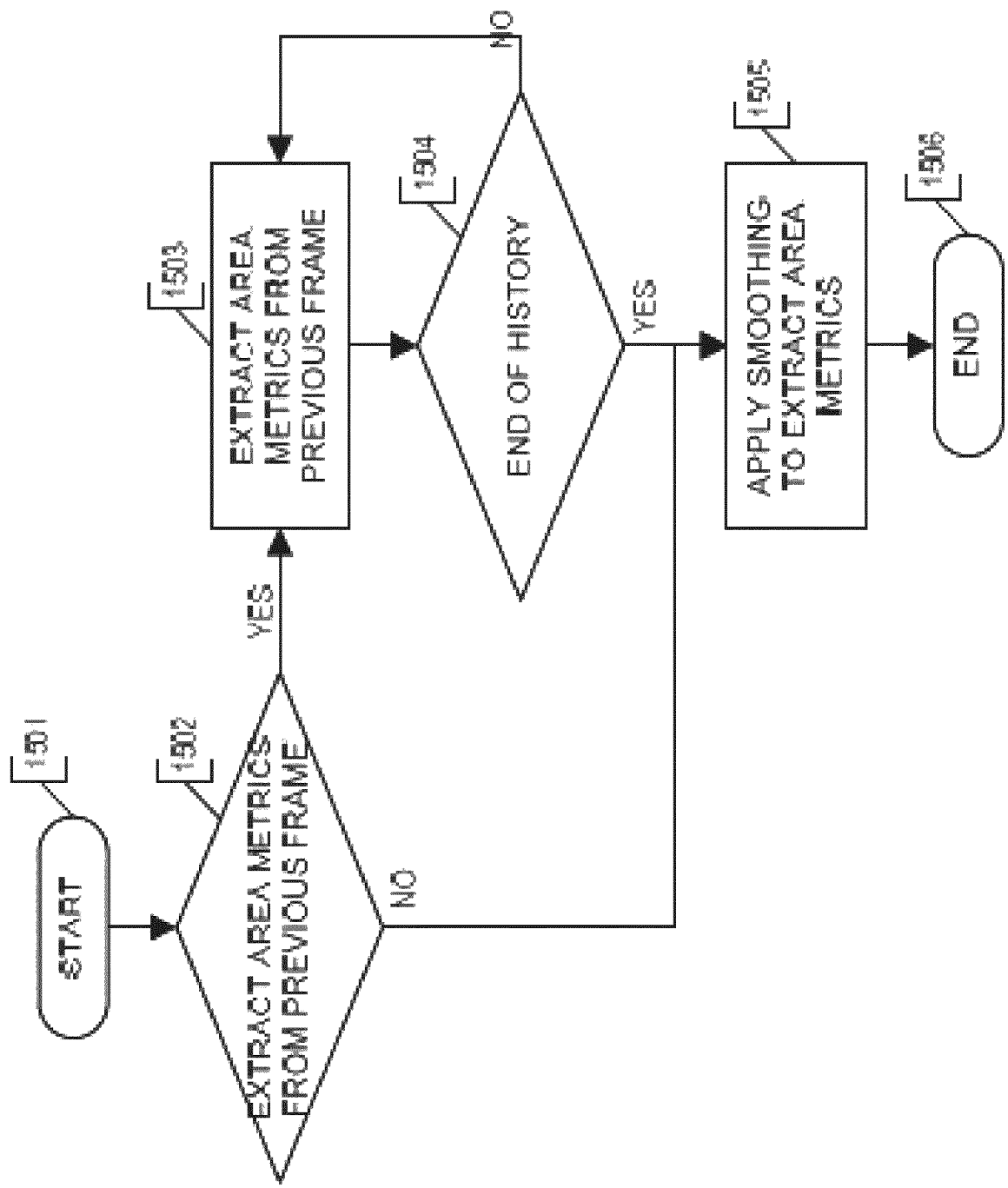
FIG. 15 shows a block diagram schematically illustrating extract area stabilization, in an example.

FIG. 15 shows an example of the extract area stabilization procedure. The stabilization procedure prevents fast modifications of the position and size. The block 1502 performs condition check to see if stabilization is required. The block 1503 gets metrics of the extract area from the previous moment of time. The number of moments may be explained as history. The block 1504 performs condition check to get as many metrics of the extract area from the past as is required by a predefined history size. The block 1505 performs the procedure of smoothing. The smoothing value SV may be determined in accordance to Equation (7): see FIG. 16.

In Equation (7) (see FIG. 16), 'N' is the size of the history; 'v' is the size of extract area 205 in the present; 'w' is the weight coefficient in the present; 'Vn' is the size of extract area 205 in the past, and 'Wn' is the weight coefficient in the past.

In an example, previous area results may be stored, for example for the previous one, two or three frames. An averaging may be performed over a few or over many frames. A state machine may describe how to zoom to a target, or to zoom out because an additional target has appeared.

Note: It is to be understood that the above-referenced arrangements are only illustrative of the application for the principles of the present disclosure. Numerous modifications and alternative arrangements can be devised without departing from the spirit and scope of the present disclosure. While the present disclosure has been shown in the drawings and fully described above with particularity and detail in connection with what is presently deemed to be the most practical and preferred example(s), it will be apparent to those of ordinary skill in the art that numerous modifications can be made without departing from the principles and concepts of the disclosure as set forth herein.

The invention claimed is:

1. A method for automatically cropping input video frames of a digital video stream to obtain output video frames, wherein obtaining the output video frames comprises:
   analyzing on a frame-by-frame basis frame metadata relating to objects in one or more of the input video frames; and
   using of the frame metadata by a processor to automatically crop one or more of the input video frames based on a target frame composition, wherein the target frame composition defines at least one of a number, identity and/or position of objects for inclusion in at least one output video frame, wherein
   the cropping is based on the detection of objects which have associated metrics, the metrics having three-dimensional space parameters, at least one of the three-dimensional space parameters relates to depth information corresponding to the objects in the one or more of the input video frames, and the cropping comprises cropping the one or more of the input video frames to selectively include at least one of the objects in the output video frame based on values of the three-dimensional space parameters associated with the at least one of the objects, respectively, and to exclude at least one further object from the output video frame based on values of the three-dimensional space parameters associated with the at least one further object.

2. The method according to claim 1, wherein the depth information is depth sensor data.

3. The method according to claim 1, wherein the cropping is based on detection of a single target object.

4. The method according to claim 1, wherein the cropping is based on detection of a plurality of target objects.

5. The method according to claim 1, wherein the target frame composition is based on a determined association between at least two objects for inclusion in the at least one output video frame.

6. The method according to claim 1, wherein the cropping is based on a scene type metric, the scene type metric identifying a given input video frame as depicting a predefined category of scene.

7. The method according to claim 6, wherein the scene type metric is based on a predefined rule describing speed of at least one object in the given input video frame.

8. The method according to claim 1, comprising determining a bounding surface area in the one or more input video frames, wherein:
   the bounding surface area of a given input video frame comprises all of the objects for inclusion in the at least one output frame; and
   the cropping is based on the bounding surface area.

9. The method according to claim 8, in which the bounding surface area is a regular polyhedron in three-dimensional space.

10. The method according to claim 1, further comprising:
    receiving, from a user and via a user interface, a selection of a given object in one or more of the input video frames, and:
    responsive to the selection, setting the target frame composition to define said given object for inclusion in at least one output video frame.

11. A system comprising a processor and storage, configured to implement a method for automatically cropping input video frames of a digital video stream to obtain output video frames, wherein obtaining the output video frames comprises:
    analyzing on a frame-by-frame basis frame metadata relating to objects in one or more of the input video frames; and
    using of the frame metadata by a processor to automatically crop one or more of the input video frames based on a target frame composition, wherein the target frame composition defines at least one of a number, identity and/or position of objects for inclusion in at least one output video frame, wherein
    the cropping is based on the detection of objects which have associated metrics, the metrics having three-dimensional space parameters, at least one of the three-dimensional space parameters relates to depth information corresponding to the objects in the one or more of the input video frames, and the cropping comprises cropping the one or more of the input video frames to selectively include at least one of the objects in the output video frame based on values of the three-dimensional space parameters associated with the at least one of the objects, respectively, and to exclude at least one further object from the output video frame based on values of the three-dimensional space parameters associated with the at least one further object.

* * * * *